United States Patent [19]
Yamagishi et al.

[11] Patent Number: 5,914,728
[45] Date of Patent: Jun. 22, 1999

[54] MOTION IMAGE DISPLAY APPARATUS

[75] Inventors: Masami Yamagishi; Tomoshisa Kohiyama, both of Yokohama; Kenichi Wada, Sagamihara; Takahiro Yamada; Taminori Tomita, both of Yokohama; Masahumi Hino; Tomoharu Maehara, both of Hadano; Kuniaki Tabata, hineode-machi; Makoto Noumi, Kawasaki; Takanori Miyamoto, Futyu, all of Japan

[73] Assignee: Hitachi, Ltd., Tokyo, Japan

[21] Appl. No.: 08/022,941

[22] Filed: Feb. 26, 1993

[30] Foreign Application Priority Data

Feb. 28, 1992 [JP] Japan ................................... 4-042813

[51] Int. Cl.$^6$ ........................................................ G09G 5/00
[52] U.S. Cl. ................... 345/507; 345/202; 345/439; 345/127; 345/154; 348/581; 348/568
[58] Field of Search ...................... 345/1, 2, 10, 11, 345/127, 132, 196, 202, 199, 154, 119, 120, 507–509, 439, 472; 348/562, 563, 564, 566, 567, 568, 552, 581, 588, 580, 582, 583; 382/298; 395/157, 164

[56] References Cited

U.S. PATENT DOCUMENTS

| 4,451,848 | 5/1984 | Okada et al. ............................ 348/476 |
| 4,799,677 | 1/1989 | Frederiksen ............................ 345/202 |
| 4,894,646 | 1/1990 | Ryman .................................... 345/202 |
| 4,991,121 | 2/1991 | Minoura et al. ........................... 345/1 |
| 5,056,041 | 10/1991 | Guttag et al. .......................... 395/164 |
| 5,068,731 | 11/1991 | Takeuchi ................................ 348/581 |
| 5,111,296 | 5/1992 | Duffield et al. ........................ 348/565 |
| 5,124,688 | 6/1992 | Rumball ................................ 345/154 |
| 5,150,461 | 9/1992 | Reynolds ............................... 345/132 |
| 5,155,593 | 10/1992 | Yonemitsu et al. ..................... 348/413 |
| 5,170,256 | 12/1992 | Tabata ................................... 348/564 |
| 5,192,999 | 3/1993 | Graczky et al. ........................ 348/552 |
| 5,249,164 | 9/1993 | Koz ....................................... 348/552 |
| 5,412,775 | 5/1995 | Maeda et al. .......................... 345/119 |
| 5,555,027 | 9/1996 | Takeuchi ................................ 345/581 |

FOREIGN PATENT DOCUMENTS

| 2-63288 | 3/1990 | Japan . |
| 2-63289 | 3/1990 | Japan . |
| 2228694 | 9/1990 | Japan ........................................ 345/10 |
| 2217080 | 10/1989 | United Kingdom ....................... 345/1 |

*Primary Examiner*—Lun-Yi Lao
*Attorney, Agent, or Firm*—Antonelli, Terry, Stout & Kraus, LLP

[57] ABSTRACT

A multimedia system capable of readily permitting expansion of its display memory as well as its compression/expansion function and other features as desired. The multimedia system is implemented by an information processing apparatus which includes a controller which controls the apparatus, an extended input/output bus for connecting with the controller, and interface device which interfaces with the extended input/output bus, at least one function extending device which extends the functionality of the controller and a local bus for permitting data exchanges between the interface device and the function extending device.

5 Claims, 23 Drawing Sheets

MOTION IMAGE DISPLAY APPARATUS

BACKGROUND OF THE INVENTION:

The present invention relates to an information processing and display apparatus such as a personal computer and, more particularly, to a multimedia information processing apparatus.

A conventional multimedia information processing apparatus is an apparatus implemented by information processing apparatuses such as personal computers (hereinafter called PC's). The conventional multimedia information processing apparatus is capable of handling in an integral manner a plurality of information media. The plurality of information media include audio data, animated pictures and still images (simply called images), any of which may come from external sources.

A PC-based conventional multimedia information processing apparatus is configured generally by inserting a circuit board containing electrical circuits for performing a desired function into an extended input/output (I/O) bus slot of the PC. One such board is a scan converter board that converts NTSC (National Television System Committee) standard video signals (hereinafter called NTSC signals) output by video equipment such as a video camera into PC display video signals for display on a display unit of the PC. Another typical board is an audio signal processing board that processes audio signals for audio output via a speaker system.

When the multimedia information processing apparatus processes images, it is common practice to incorporate an image data compression/expansion board in the apparatus. This is because images include huge amounts of data to be processed.

Aside from the above-described boards that handle only one information medium per board, there exist boards each capable of integrally addressing a plurality of information media such as voice and images. Many boards that handle images may be supplemented functionally by an on-board display memory for enhancing the resolution of image display and for increasing the number of display colors available.

A conventional mode of display on PC's is multi-window display. Multi-window display is a manner of display in which the results of processing by a plurality of programs are shown separately in a plurality of rectangular areas (called windows) on the display screen, the positions and sizes of the areas being determined beforehand.

In the conventional multimedia information processing apparatus utilizing multi-window display, the size of each rectangular display area on the screen is set to be a full-screen, a half-screen, a quarter-screen, etc.

Described below are some known examples in which the display data of an image from an external video apparatus are superimposed on the display data of the PC. This process is known as keying. A first example of keying involves superimposing image data onto a specific color of PC display data. This method is called chromakey.

FIG. 17 is a schematic view of a device which implements a chromakey process. In this example, both the image data and the PC display data are in analog format as they are superimposed onto one another. In FIG. 17, reference numeral 1505 is the image data from a video apparatus, 1506 is the PC display data, 1509 is a display data switch for chromakey operation and 1510 is a display data switching signal that is input to the display data switch for switching control. 1502 is a color generator for generating data about the color on which to superimpose the image and 1503 is a comparator for comparing the color data from the color generator 1502 with the PC display data 1506 for color coincidence.

In the color generator 1502 is set beforehand the color on which to superimpose the image data. The display data switch 1509 is usually set to the position of the PC display data 1506 to allow the data 1506 to appear on display 123. The PC display data 1506, besides being fed to the display data switch 1509, is also input concurrently to the comparator 1503 for comparison with the color data generated by the color generator 1502. If a color coincidence is detected in the comparison, the comparator 1503 sends the display data switching signal 1510 to the display data switch 1509 so that the switch 1509 will be switched to the position of the image data 1505. This allows the image data 1505 to appear on the display 123.

Another example of keying will be described below. This example involves using a keying data memory (called a control plane) which is constructed to reflect the same display resolution as that of the PC and which offers at least one bit of storage capacity per pixel. The keying data is data whose values are used unchanged for the switching of display data.

FIG. 18 is a schematic view of a conventional chromakey process using a control plane. In FIG. 18, reference numeral 1501 is the control plane. The remaining components are the same as in FIG. 17. The data of the control plane 1501 is predetermined. For example, a "1" causes the image data 1505 to be displayed and a "0" causes the PC display data 1506 to be displayed. One's are written to those positions in the control plane 1501 which reflect those positions on the display 123 where images are to be displayed. The data of the control plane 1501 is read out concurrently with the data of a PC display data memory, not shown. The data that is read out are input in the form of a display data switching signal 1510 to the display data switch 1509 for and between image data 1505 and PC display data 1506.

An application of the multimedia system is a video conference system. An example of a conventional video conference system based on the multimedia system will now be described. The conventional video conference system is configured by connecting PC's or like terminals established at a plurality of locations via a network. These terminals are interconnected to let their users hold a video conference.

The conventional video conference system works typically as follows. Images coming from a plurality of terminals are composed at each terminal into a single composite picture containing the multiple input images, as disclosed in Japanese Patent Laid-Open No. 2-63288 or No. 2-63289.

FIG. 24 is a view of a display example generated by a conventional video conference system. The figure shows images displayed on a display unit of a terminal configured in the system, the images being sent from other 16 terminals. As indicated, one composite picture comprises images 2201 through 2216 showing waist-up images of 16 participants of the conference.

One aspect of the conventional multimedia system outlined above involves utilizing extension circuit boards having thereon various circuits to implement various functions. The scheme allows PC-based multimedia equipment to be established with ease.

However, there are some boards such as a scan converter board and an audio signal processing board each capable of addressing only one information medium. Each of these boards, lacking compatibility with other boards, is incapable of operating in synchronism therewith. For example, an audio signal processing board cannot provide its audio output in synchronism with images coming from a scan converter board. Where there arises a need to expand the functions of the existing resources to deal with a plurality of information media, the user has heretofore had no choice but to discard the existing resources and to purchase anew a board that would address such multiple information media.

A board capable of addressing a plurality of information media, e.g., a board dealing with video and audio data at the same time, may handle the multiple media in synchronism. However, where it is desired to supplement the board with other functions, the user is faced with the same restrictions as those applied to the above-mentioned scan converter and audio signal processing board. If the user has no need for some of the multiple functions provided by the single board, there is no choice for the user but to make the unnecessary expenditure to purchase the entire board.

If the display memory on the board is expanded to enhance the resolution of image display or to increase the number of display colors, another disadvantage is liable to occur. That is, the increase in the number of pixels or in the number of display colors leads to an increase in the amount of data per pixel. That in turn results in a significantly reduced speed at which to write data to the display memory for display purposes.

Another aspect of the conventional system involves displaying images from external video equipment within a window framework. In this case, the size of image display is controlled easily. However, this feature hampers the ability to change the window display size as desired.

The chromakey process of the conventional system has the advantage of requiring no specific control measures when a mouse cursor or other graphic image is superimposed on an image being displayed. However, if another window is superimposed on a multi-window image being displayed and if the superimposed window has the same color as that of the background image, the background image can become visible in the foreground with the window becoming transparent.

In cases where keying is performed using a control plane arrangement, the background image under a superimposed window does not become visible, with the window kept from becoming transparent. This is because the control plane data of the hidden image part are of values that select PC display data (e.g., 0's). However, if it is desired to display a mouse cursor or like graphic image superimposed on the existing image, the same shape as, say, the mouse cursor must be written to the control plane as needed. This turns out to be a considerable burden on the keying process.

Where the multimedia system is utilized in a video conference system, images from a plurality of sources are composed into a single composite image for display on each terminal. With this configuration, it is impossible to divide the composite image into original images for display at any desired positions on the display screen.

SUMMARY OF THE INVENTION

It is therefore a first object of the present invention to provide an information processing apparatus capable of readily expanding the functions of its display memory and its compression/expansion processor as desired by the user.

It is a second object of the invention to provide a display apparatus which, when displaying images from video equipment in a multi-window framework, positions the images at desired sizes and where desired on the screen according to window size.

It is a third object of the invention to provide a display apparatus using a display memory that prevents the slowdown of the speed at which to write data thereto when the display memory is expanded to display image data over the entire screen.

It is a fourth object of the invention to provide an image superimposing method which, in the case of the chromakey-based superimposing process, prevents the background image from becoming apparent through the window superimposed thereon and which, in the case of the control plane-based superimposing process, eliminates the need to write as required the same shape as the graphics superimposed on the image into the control plane, thereby alleviating the processing burdens on the superimposing process.

It is a fifth object of the invention to provide a display apparatus which, when applied to a multimedia system incorporated in a video conference system, divides the whole composite image into original images coming from a plurality of sources so that these individual images are displayed where desired on the display screen.

In achieving the first object of the invention, there is provided an information processing apparatus which includes a personal computer (PC), a local bus mounted on a circuit board, an input device for inputting data from video equipment, a display memory for storing display data, an image data compressing/expanding device for compressing and expanding data, and an interface device for interfacing with an extended I/O bus of the PC. The local bus is connected to the input device, the display memory, the image data compressing/expanding device and the interface device. The interface device is connected to the PC for data exchanges among the various devices via the local bus.

The local bus is mounted on a circuit board. The input device, display memory, image data compressing/expanding device and the interface device commonly interface with the local bus. The interface device connects the local bus to the input device for inputting data from the video apparatus to the display memory and to the image data compressing/expanding device. This allows the local bus to exchange data between each of the devices. Any of the devices may be connected to or disconnected from the local bus for functional expansion or isolation. New functions may also be added easily through connection to the local bus.

In achieving the second object of the invention, there is provided a display apparatus which includes a frequency varying device for varying, as desired, the sampling frequency of analog-to-digital converter constituting part of the input device of external video apparatus, a storage for storing, by the amount of one horizontal scan, the image data converted to a digital signal at the clock rate of the sampling frequency, a line address generator for generating an address by which to read, at a desired rate of increase, the contents of a display memory accommodating data from the storage means for display purposes, and a temporary storage for temporarily storing the address thus generated at the timing of line-wise reading and display.

The maximum sampling frequency for the analog-to-digital convertor is the frequency at which to sample, by the number of horizontal pixels on a PC display screen, one horizontal scanning period coming from the video apparatus. One data item sampled constitutes data of one pixel on the display screen. Digital image data of one horizontal scan which came from the video apparatus and which were converted to the digital data at the clock rate of the maximum sampling frequency are stored in the storage at the same clock rate. Data is transferred from the storage to the display memory at the timing required by the IC's constituting the display memory. The lower the sampling frequency of the analog-to- digital converter, the smaller the number of horizontal pixel data, i.e., the smaller the sampling count per horizontal scanning period from the video apparatus.

Display data is read from the display memory always at a constant timing. This means that the smaller the number of pixel data per horizontal scan, the smaller the horizontal display area.

The minimum rate of address increase of the line address generator is equal to the horizontal frequency of the PC's display unit. The size of vertical image display at this point equals the number of vertical display pixels of the PC. As the rate of address increase is raised, the addresses output by the temporary storage which temporarily stores them for linewise reading and display become discrete the difference between the addresses gradually increases.

Data is read and displayed using line addresses of the display memory which are generated in the manner described above. This makes it possible to vary as desired the vertical size of the image on the display screen by manipulating the rate of address increase of the line address generator.

In achieving the third object of the invention, there is provided a display apparatus which includes a display memory made of separate display memory integrated circuits (IC's) for storing pixel data in blocks of two by two pixels for display on a screen. The display memory accommodates the data of one pixel out of the two by two pixel block when not expanded accommodates additionally the data of the other three pixels when expanded. In the case of writing display data after memory expansion, data is written only to the one-pixel display data memory IC while the same data is written concurrently to the other three-pixel display data memory IC's.

In a two by two block on the display screen, the data of each pixel are stored in a separate display memory IC. This means that when the same data is to be written in one block, a single write operation covers the entire data. Under this control scheme, it takes the same amount of time to write data for the entire screen whether the display memory is expanded or not expanded.

In achieving the fourth object of the invention, there is provided an image superimposing method for indicating an image display area on a display unit using control plane data, and for superimposing one image onto another by the chromakey process.

Because the image display area is shown using control plane data, the background image under a window does not become visible through that window as the latter is superimposed on the image display area. Graphic indications on the image are switched using chromakey. This eliminates the processing burdens stemming from updating the control plane according to graphics.

In achieving the fifth object of the invention, there is provided a display apparatus which includes a coordinate setting device for setting the coordinates, on a display screen, of each of a plurality of images coming from a plurality of sources, the images being arranged to constitute a composite image on the display screen, a pixel data position detecting device for checking the pixel data of an input image signal to see which individual image the data represent and where in the individual image the pixel data are positioned, a display position determining device for determining the display position of the pixel data in accordance both with the coordinates set by the coordinate setting device and with the pixel data position detected by the pixel data position detecting device and a data writing device for writing the pixel data to those positions in a display memory which are determined by the display position determining device.

The coordinate setting device is provided for each of the images by use of a central processing unit (CPU) or the like. An input composite image typically measures 640 pixels by 480 pixels. The size of individual images before their composition into one image is 160 pixels by 120 pixels. Sixteen such images constitute one composite image, or four images by four within the display framework. The pixel data position detector checks the input pixel data to see which individual image the pixel data represent and where in the individual image the pixel data are positioned. The information detected by the pixel data position detector about the individual image is sent to the coordinate setting device whereby the display coordinates corresponding to the image are read out. The display position determining device adds the pixel data position information to the coordinates that are read by the coordinate setting device. The resulting sum is converted to that location in the display memory to which to write data.

The display memory location to write data to for each individual image is determined so that the composite image comprising various images from a plurality of sources is divided into original images for display where desired on the display screen. When the coordinate setting device is reset, the image display position may be varied as desired.

DETAILED DESCRIPTION OF THE PREFERRED EMBODIMENTS

Figure 1:
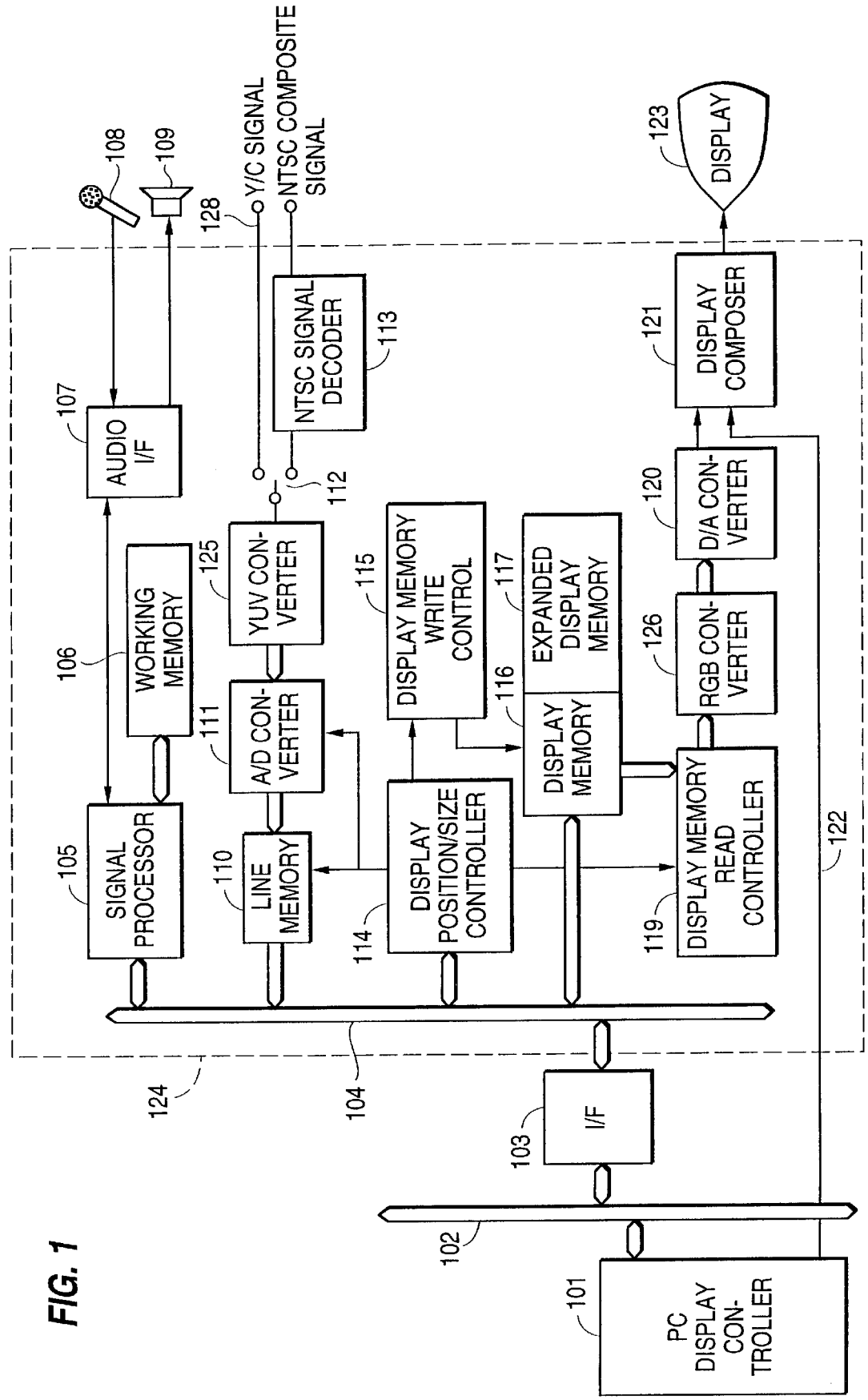
FIG. 1 is a block diagram illustrating a first embodiment of a multimedia system of the invention.

Preferred embodiments of the invention will now be described with reference to the accompanying drawings. A first embodiment of the invention will be described with reference to FIG. 1. This embodiment and its variations are intended to accomplish the first stated object of the invention. FIG. 1 is a block diagram of a multimedia system of the invention comprising a data compressing/expanding device and an expanded display memory.

In FIG. 1, reference numeral 101 is a display controller of the PC that serves as the basis for the multimedia system, 102 is an extended I/O bus of the PC and 103 is an interface device for interfacing the extended I/O bus 102 to a multimedia processor 124.

The multimedia processor 124 includes local bus 104, and a signal processor 105 for compressing and expanding image and audio data. A working memory 106 is used by the signal processor 105 for data compression and expansion. An audio interface device 107 interfaces the signal processor 105 to an audio input device 108 for receiving audio data and to audio output device 109 for outputting audio data. A NTSC signal decoder 113 decodes a luminance signal Y and a color difference signal C (both signals may hereinafter be called generically the Y/C signals) from an NTSC composite signal coming from an external video apparatus, not shown and an input signal switch 112 switches between the Y/C signals decoder by the NTSC signal decodes 113 and Y/C signals from a separate terminal 128.

A YUV converter 125 converts to YUV signals the Y/C signals selectively input through the input signal switch 112. An analog-to-digital (A/D) converter 111 converts the analog YUV signals from the YUV converter 125 into digital YUV signals and a line memory 110 stores, by the amount of one horizontal scan, the digital YUV signals from the A/D converter 111. A display position/size controller 114 controls the display position and size of the image to be displayed and a display memory write controller 115 controls the writing of data to a display memory 116. An expanded display memory 117 coupled to the display memory 116, provides the display memory 116 with additional memory to permit the achievement of the same resolution as that of the PC. A display memory read controller 119 controls the reading of data from the display memory 116.

RGB converter 126 is provided for converting to RGB format the image data stored in YUV format in the display memory 116 and digital-to-analog converter 120 (D/A) converts the digital RGB signal from the RGB converter 126 into an analog RGB signal. A display composing device 121 combines display data 122 from the PC display controller 101 with display data from the D/A converter 120 and displays the data on display 123. Display 123 maybe a CRT.

Below is a description of how the image from an external video apparatus is displayed directly (this process is called "through display") on the display 123.

The input signal switch 112 is switched by the user according to the desired purpose. It is assumed here that the switch 112 is set to the NTSC composite signal side. The NTSC composite signal coming from the external video apparatus is decoded by the NTSC signal decoder 113 into a Y signal, a C signal and a synchronizing signal. The Y/C signals are input to the YUV converter 125 through the input signal switch 112 for conversion to YUV signals. After conversion, the YUV signals are input to the A/D converter 111. The A/D converter 111 converts each of the Y, U and V signals to a digital signal. The sampling clock frequency for the analog-to-digital converter 111 is provided by the display position/size controller 114 according to display size. The line memory 110 stores, by the amount of one horizontal scan, the image data converted to digital form by the A/D converter 111. Because the line memory 110 permits asynchronous writing and reading thereto and therefrom, the memory is used to effect the timing conversion of the image data. That is, data is written to the line memory 110 at the same timing as the NTSC composite signal, and data is read from the line memory 110 at the same timing as writing of data to the display memory 116.

The image data of one horizontal scan written in the line memory 110 is sent via the local bus 104 to the display memory 116 for storage. The image data, before being written to the display memory 116, is controlled for horizontal display size with the sampling clock upon conversion to digital image data by the A/D converter 111. The vertical size of the image data is the same as the total effective vertical scanning line count of the NTSC composite signal and such size is stored in the display memory 116.

As with the line memory 110, the display memory 116 is capable of asynchronous writing and reading thereto and therefrom. Thus data for display is read from the display memory 116 at the display timing of the display 123. The display memory read controller 119, together with the display position/size controller 114, changes the rate of line address increase during display data read-out so that the lines read from the display memory 116 are thinned out. Since the display timing of the display 123 remains constant, the thinning-out operation controls the vertical size of image display. How the display position/size controller 114 works will be described later in more detail.

The image data that was read out under control of display position and size is converted from YUV to RGB format by the RGB converter 126. The converted image data is then converted to analog format by the D/A converter 120 before being input to the display composing device 121. The display composing device 121 combines the analog image data with the display data 122 coming from the PC display controller 101 for display onto the display 123. How the display composing 121 works will be described later in more detail.

What follows is a description of how an image coming from an external video apparatus is compressed or expanded. The operations ranging from the separate terminal S or NTSC composite signal terminal up to the line memory 110 are the same as in the above-described through display process of displaying images.

The image data written in the line memory 110 is placed onto the local bus 104. The image data on the local bus 104 is written to the memory 106 via the signal processor 105. After one or a plurality of screens of the image data is stored in the memory 106, the signal processor 105 compresses the data according to predetermined algorithms. The compressed image data is output to the extended I/O bus 102 of the PC via the local bus 104 and the interface device 103. From the bus 102, the data is stored into an external storage unit connected thereto, not shown.

The image data stored in the external storage unit is displayed as follows. The image data in the external storage unit is converted from their compressed format to the original image data by the signal processor 105. Initially, the compressed image data is placed into the memory 106 through the interface device 103, local bus 104 and signal processor 105. After this, the signal processor 105 reads the image data from the memory 106 for expansion, and develops the expanded data in the display memory 116 via the local bus 104. At this time, the signal processor 105 provides display size control simultaneously. Display position control is provided by the signal processor 105 when the expanded display memory 117 is in effect, whereby the image data is developed where desired within the display memory 116. If the expanded display memory 117 is not used, the display position/size controller 114 provides display position control in the same manner as in the through display process.

The image data, after being expanded and written to the display memory 116 or to both the display memory 116 and the expanded display memory 117, is read out therefrom for display onto the display 123 in the same manner as in the through display process.

Below is a description of how a still image is displayed on a full screen (i.e., the same display size as that of the PC). A full screen still image may be displayed only when the expanded display memory 117 is used. The image data representing the still image may be read as a file from an external storage unit attached to the PC, or may be read by an image scanner used as a peripheral device of the PC. The image scanner is generally connected to the expanded I/O bus 102.

After being read from its source, the image data is transferred by the CPU of the PC or by its equivalent, not shown, to the display memory 116 and expanded display memory 117 for display via the interface device 103 and local bus 104.

Audio data is handled as follows. Audio data from an external source is input through audio input device 108. The data is converted to a digital signal by the audio interface device 107. The audio data in digital format is input to the signal processor 105 and written temporarily to the memory 106. After this, the audio data is read from the memory 106 and compressed according to predetermined algorithms. The compressed data is sent to the external storage unit of the PC for storage via the local bus 104, interface device 103 and expanded I/O bus 102. To reproduce audio data stored in the external storage unit requires reversing the steps for compressing and storing the data as described above. That is, the audio data in the external storage unit of the PC is written initially to the memory 106 via the expanded I/O bus 102, interface device 103, local bus 104 and signal processor 105. The audio data written in the memory 106 is read therefrom by the signal processor 105 for expansion. The audio data converted to its original format through expansion is converted to an analog signal by the audio interface device 107. The analog audio signal is output from audio output device 109.

Figure 2:
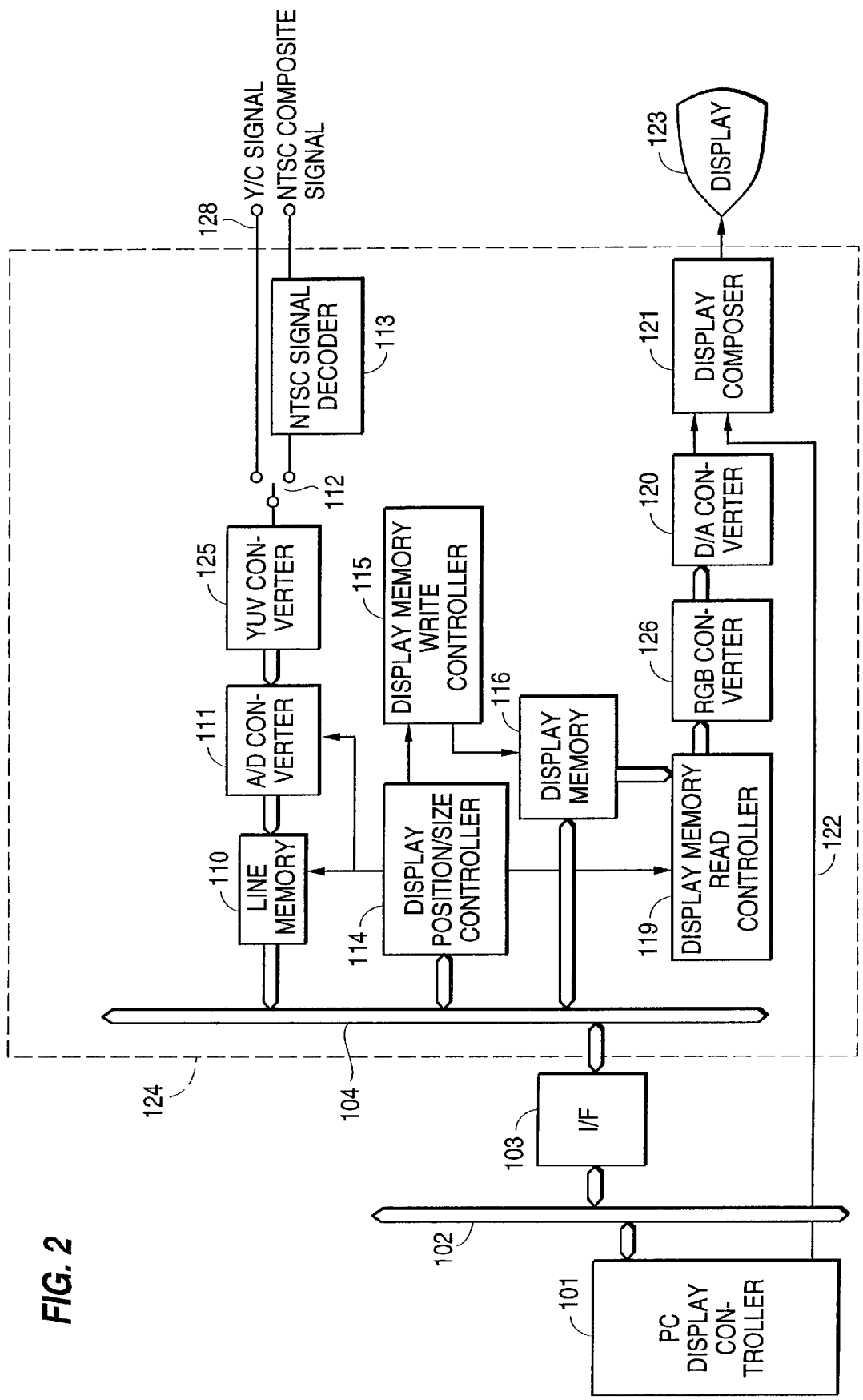
FIG. 2 a block diagram illustrating a second embodiment of a multimedia system of the invention.

FIG. 2 is a block diagram showing the basic construction of a multimedia system of a second embodiment of the invention excluding a compression/expansion processor, audio input/output device and an expanded display memory. The second embodiment is capable of performing only the through display process of displaying images. The operations of the embodiment of FIG. 2 are the same as those of the embodiment of FIG. 1, and descriptions thereof are omitted.

Figure 3:
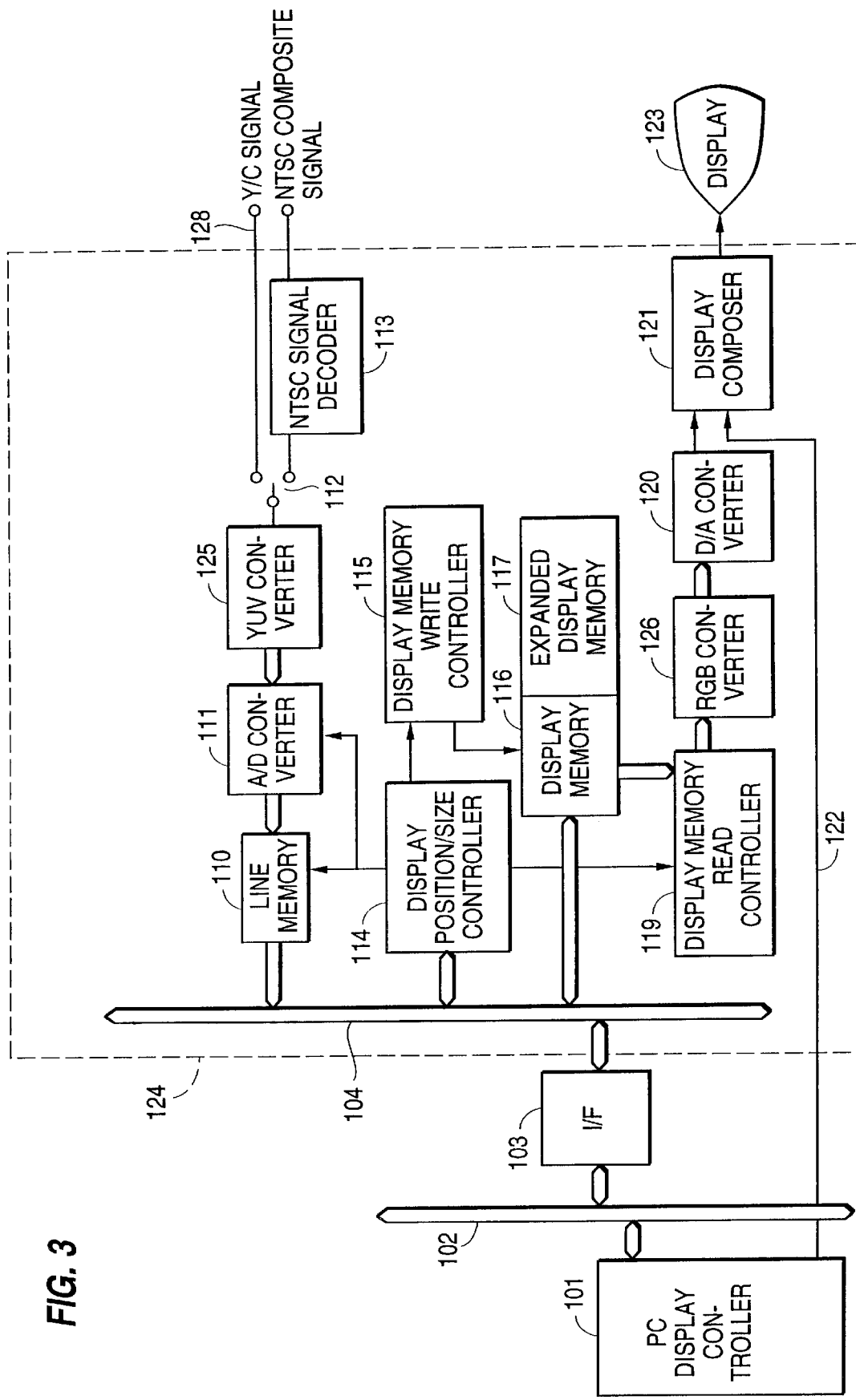
FIG. 3 is a block diagram illustrating a third embodiment of a multimedia system.

FIG. 3 is a block diagram of a third embodiment of a multimedia system embodiment of the invention. The third embodiment is a modified version of the second embodiment of FIG. 2 which was supplemented by the expanded display memory 117. The third embodiment of FIG. 3 is capable of not only performing the through display process of displaying images but also the display of full screen still images.

Figure 4:
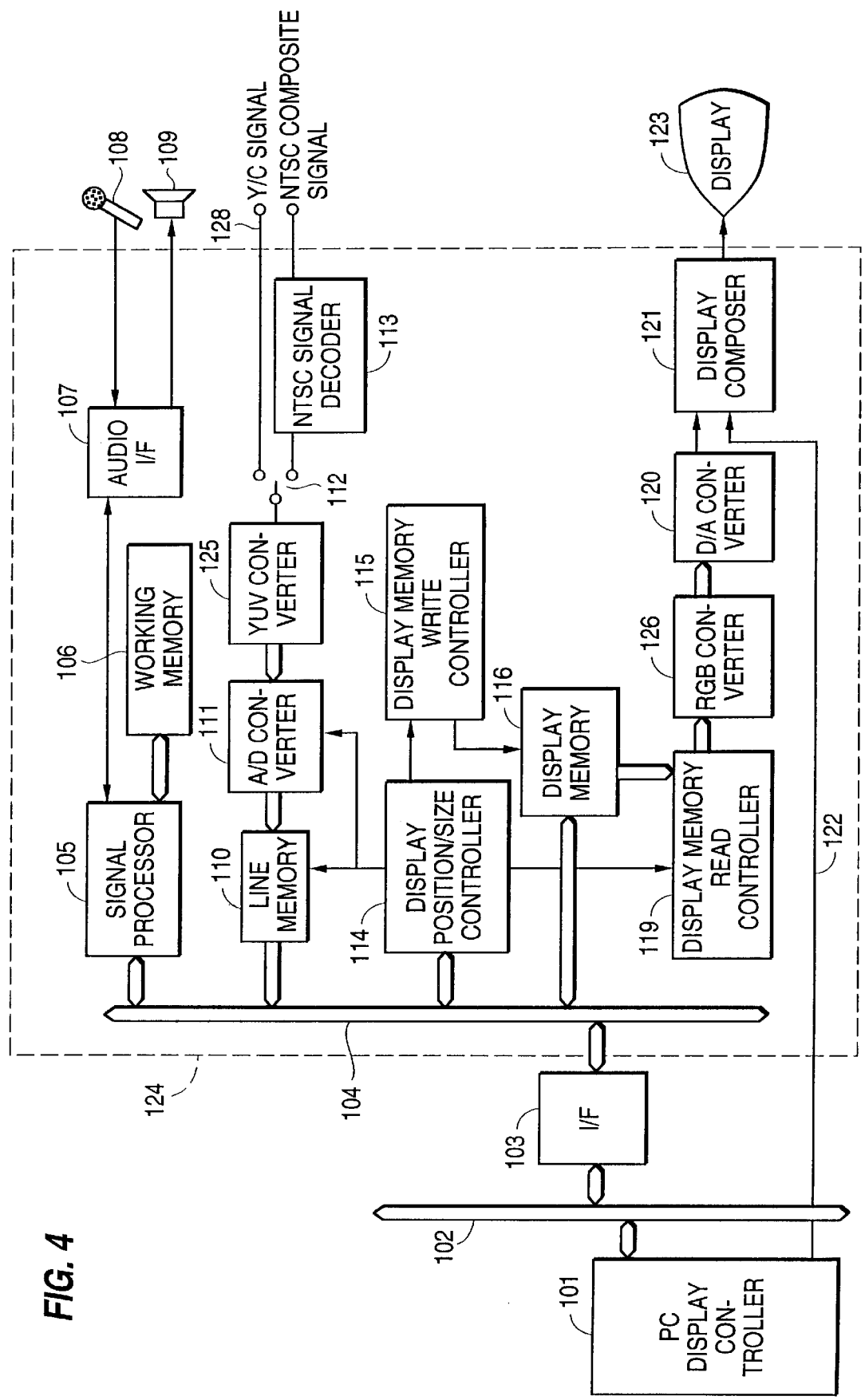
FIG. 4 is a block diagram illustrating a fourth embodiment of the invention.

FIG. 4 is a block diagram of a fourth embodiment of a multimedia system of the invention. The fourth embodiment of FIG. 4 is a modified version of the first embodiment of FIG. 1 devoid of the expanded display memory. The fourth embodiment of FIG. 4 is capable of the through display process of displaying images, of the compression and expansion of image data, and of audio input and output processing. Because of the lack of an expanded display memory, the fourth embodiment of FIG. 4 does not provide the display of full screen still images.

Using any one of the embodiments described above, the user may expand the functions of the multimedia system of the present invention as desired.

What follows is a detailed description of how the RGB conversion means works. In the mathematical expressions employed below, upper-case symbols (e.g., Y, U, V) stand for analog values and lower-case symbols (e.g., y, u, v) for digital values.

The defining expressions of YUV and RGB signals are as follows:

Expression Group 1

$$Y=0.298822R+0.586816G+0.114363B$$

$$U=R-Y=0.701178R-0.586816G+0.114363B$$

$$V=B-Y=-0.298822R-0.586816G+0.885673B$$

where, $$0.0<R, G, B<1.0$$

$$0.0<Y<1.0$$

$$-0.701<Y<+0.701$$

$$-0.886<U<+0.886$$

In addition, $$G=Y-0.509228V-0.194888U$$

$R=Y+V$ $B=Y+U$ where, $0.0 < R, G, B < 1.0$ $0.0 < Y < 1.0$ $-0.701 < V < +0.701$ $-0.886 < U < +0.886$ From Expression Group 1, Y, U and V may be normalized into Y', U' and V' which are defined as follows:

Expression Group 2

$Y'=Y$ $U'=0.5V/0.701+0.5$ $V'=0.5U/0.886+0.5$ where, $0.0 < Y', U', V' < 1.0$ $0.0 < Y < 1.0$ $-0.701 < V < +0.701$ $-0.886 < U < +0.886$ When Y', U' and V' are converted to, and according to CCIR 601, the latter values are defined as shown below. CCIR 601 is an international standard that stipulates the sampling frequencies, quantization numbers and other relevant parameters needed to digitize video signals such as NTSC signals.

Expression Group 3

$y=(235-16)Y'+16$, where $16 < y < 235$ $u=(240-16)U'+16$, where $16 < u < 240$ $v=(240-16)V'+16$, where $16 < v < 240$ From Expression Groups 1, 2 and 3, the values , and are defined as follows:

Expression Group 4

$y=219Y+16$ $u=112U/0.886+128$ $v=112V/0.701+128$ where, $0.0 < Y < 1.0$ $-0.701 < V < +0.701$ $-0.886 < U < +0.886$ $16 < y < 235$ $16 < u, v < 240$ Meanwhile, the values G, R and B are defined as follows:

Expression Group 5

$G=0.004566y-0.003187v-0.001541u+0.532242$ $R=0.004566y-0.006259v-0.874202$ $B=0.004566y+0.007911u-1.085631$ $0.0 < R, G, B < 1.0$ $16 < y < 235$ $16 < u, v < 240$

Furthermore, the values, and ($0 < r, g, b < 255$) are defined as follows:

Expression Group 6

$g=y-0.698001v-0.337633u+116.56116$ $r=y+1.370705v-191.45029$ $b=y+1.732446u-237.75314$ where, $16 < Y < 235$ $16 < y, v < 240$ $0 < r, g, b < 255$ If the expressions in Expression Group 6 are computed on the of eight bits, the results are as follows:

Expression Group 7

$g=y-(2^{-1}+2^{-3}+2^{-4}+2^{-7})v-(2^{-2}+2^{-4}+2^{-6}+2^{-7})u+(2^6+2^5+2^4+2^2)$ $r=y+(2^0+2^{-2}+2^{-4}+2^{-5}+2^{-6}+2^{-7})v-(2^7+2^5+2^4+2^3+2^2+2^1+2^0)$ $b=y+(2^0+2^{-1}+2^{-3}+2^{-4}+2^{-5}+2^{-6})u-(2^7+2^6+2^5+2^3+2^2+2^0)$ where, $(00010000)2 < y < (11101011)2$ $(00010000)2 < u < (11110000)2$ $(00010000)2 < v < (11110000)2$ The subscript "2" attached to the parentheses above indicates that the numbers therein are binary numbers.

Figure 13:
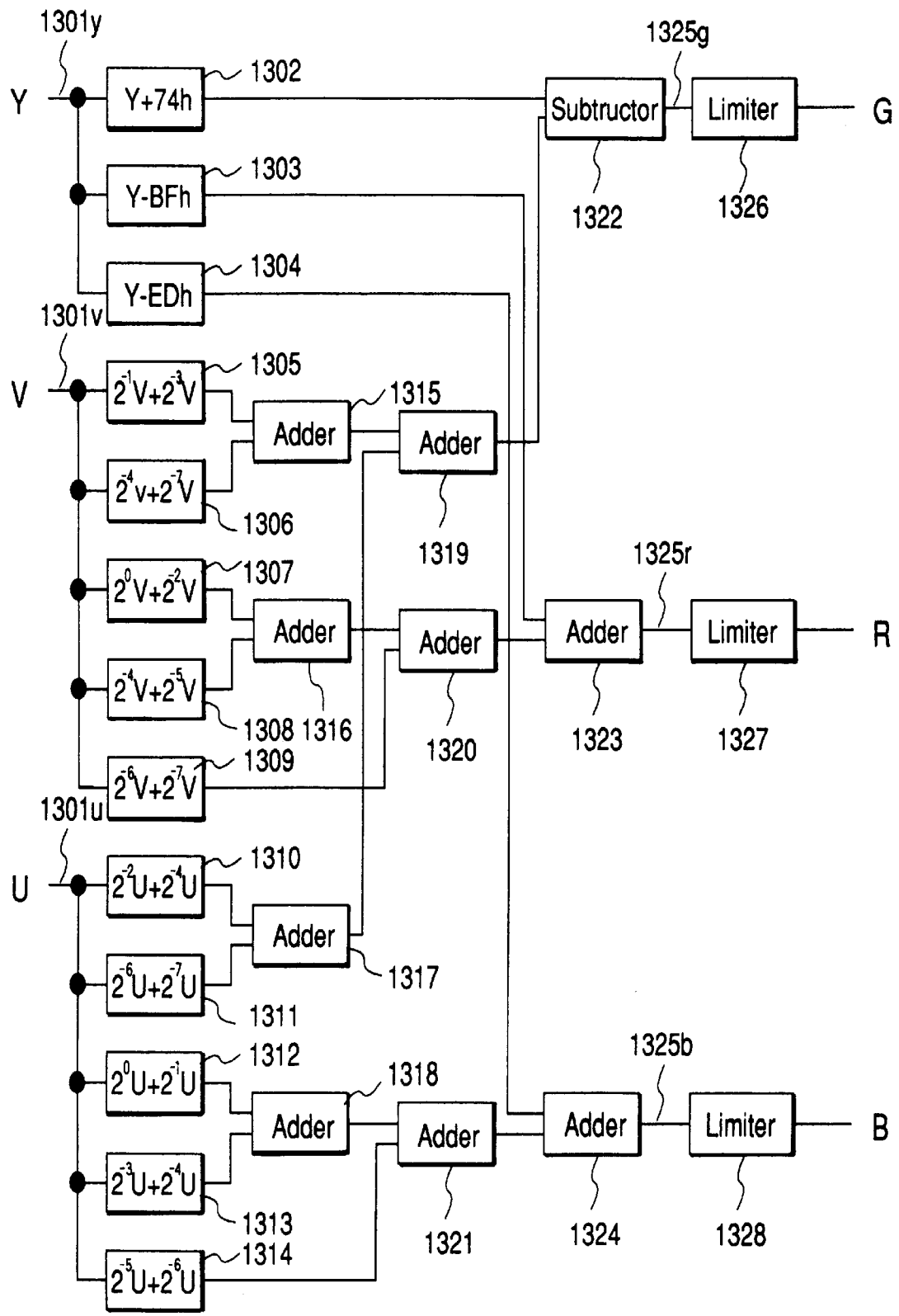
FIG. 13 is a block diagram of a first example of a RGB converter of the invention.

The following is a description of how the RGB conversion is implemented based on Expression Group 7. FIG. 13 is a block diagram of a first example of the RGB converter 126. In FIG. 13, the input signals of the Y, U and V signals are denoted by 1301y, 1301u and 1301v, respectively. The output signals of the R, G and B signals are denoted by 1325r, 1325g and 1325b, respectively. These input and output signals are each given in eight bits. Reference numerals 1302, 1305 through 1321, 1323 and 1324 are adders; 1303, 1304 and 1322 are subtracters; and 1326 through 1328 are limiters.

How the G signal is converted to the G output signal 1325g will now be described. Initially, the adder 1302 adds the Y input signal 1301y and a constant (01110100). The constant is indicated as 74h in hexadecimal notation in FIG.

13. The adder 1305 then adds two values, one value being the result of executing V×2⁻¹, i.e., shifting the eight-bit V input signal 1302v right one bit, the other value being the result of executing V×2⁻³, i.e., shifting the V input signal 1302v right three bits. The adder 1306 adds the results of making two calculations, V×2⁻⁴ (shifting the signal right 4 bits) and V×2⁻⁷ (shifting the signal right 7 bits). The adder 1310 adds the results of executing U×2⁻² and U×2⁻⁴ while the adder 1311 adds the results of executing U×2⁻⁶ and U×2⁻⁶. The adder 1317 adds the results coming from the adders 1310 and 1311. The adder 1319 adds the results from the adders 1315 and 1317 to calculate the negative component. After this, the subtracter 1322 subtracts the output of the adder 1319 from the result of the adder 1302, thereby calculating the G output signal 1325g.

How the R signal is converted to the R output signal 1325r will now be described. Initially, the subtracter 1303 subtracts a constant (10111111)2 from the Y input signal 1301y. The constant is indicated as BFh in hexadecimal notation in FIG. 13. The adder 1307 adds the results of executing V×2⁰ and V×2⁻²; the adder 1308 adds the results of V×2⁻⁴ and V×2⁻⁵; and the adder 1309 adds the results of V×2⁻⁶ and V×2⁻⁷. The adder 1316 adds the results from the adders 1307 and 1308 while the adder 1320 adds the results from the adders 1309 and 1316. Finally the adder 1323 adds the results from the adders 1303 and 1320, thereby calculating the R output signal 1325r.

Described below is how the B signal is converted to the B output signal 1325b. Initially, the subtracter 1304 subtracts a constant (11101101)2 from the Y input signal 1301y. The constant is indicated as EDh in hexadecimal notation in FIG. 13. The adders 1312, 1313, 1314, 1318 and 1321 perform the same kinds of add operations on the U signal as those made on the V signal in obtaining the R output signal 1325r. Finally the adder 1324 adds the results from the adder 1321 and from the subtracter 1304, thereby calculating the B output signal 1523b.

In FIG. 13, the limiters 1326, 1327 and 1328 each output either 0 or 255. The value 0 is output by the relevant limiter if any one of the R, G and B signals calculated by the adder-subtracter combination is less than 0 when expressed as eight-bit digital data. The value 255 is output if any of the R, G and B signals calculated by the adder-subtracter combination is more than 255 when expressed as eight-bit digital data.

According to the above-described first example of the RGB converter 126 only three kinds of circuits (adder, subtracter and limiter) are used to configure the RGB converter 126. This configuration minimizes the circuit constitution of the RGB converter 126.

Figure 14:
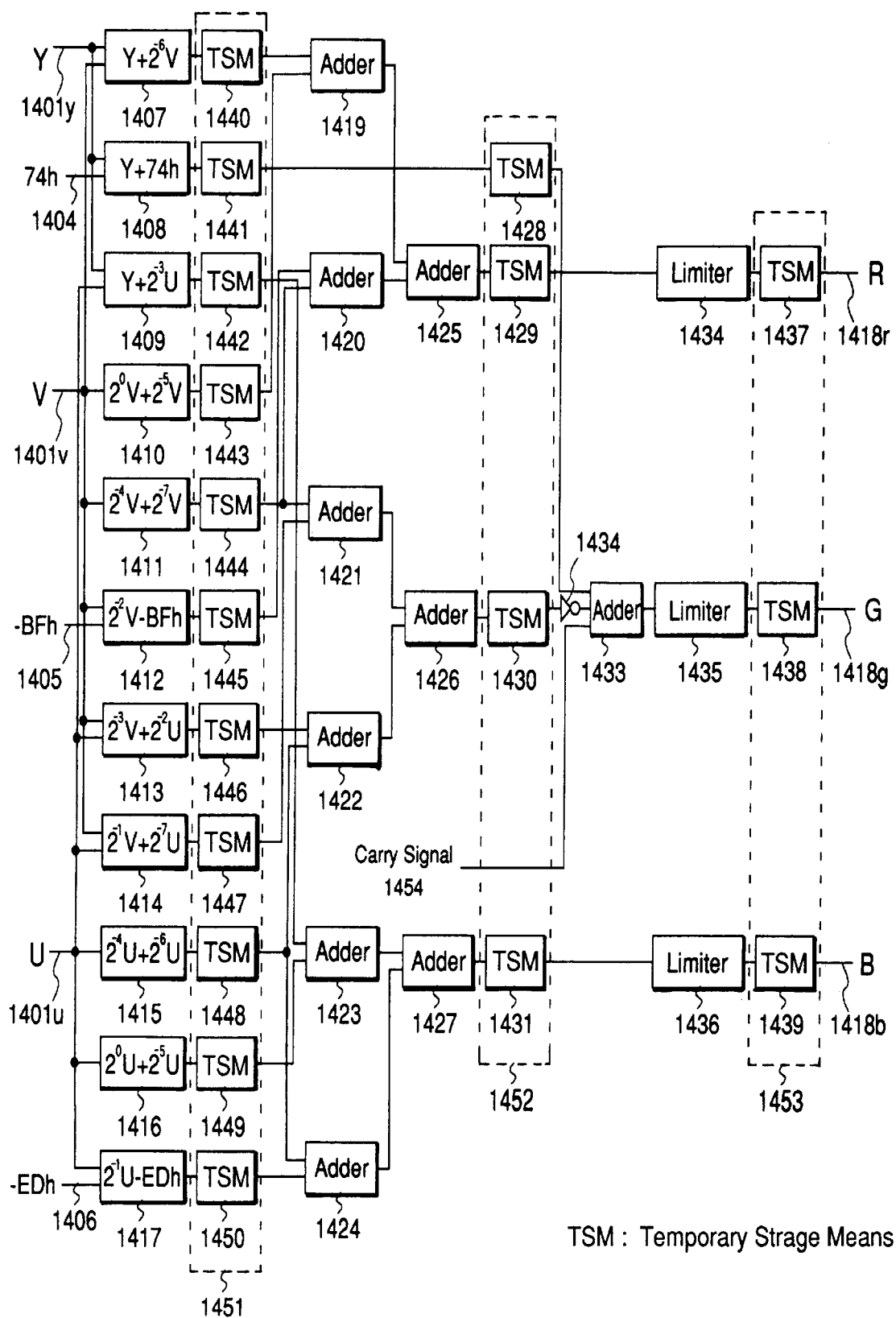
FIG. 14 is a block diagram of a second example of the RGB converter according to the invention.

Described below is of how a second example of the RGB converter 126 is practiced. FIG. 14 is a block diagram of the second example of the RGB converter 126. In the second example, a temporary storage is inserted in the signal path. In this circuit construction, the adders included are shared through modification of Expression Group 7 as follows:

Expression Group 8

$$g=(y+74h)+(2^{-4}v+2^{-7}v)+(2^{-1}v+2^{-7}u)+(2^{-3}+2^{-2}u)+(2^{-4}u+2^{-6}u)$$

$$r=(y+2^{-6}v)+(2^{0}v+2^{-5}v)+(2^{-4}v+2^{-7}v)+(2^{-1}v-Bfh)$$

$$b=(y+2v)+(2u+2u)+(2u+2u)+(2u-EDh)$$

In Expression Group 8, one adder is assigned to each set of parentheses containing two values. In grouping the values by parentheses into terms, the values of minimum bit counts are combined so as to reduce the bit count of each adder. The add operation in the term $(2^{-4}v+2^{-7}v)$ of Expressions and that in the term $(2^{-4}u+2^{-6}u)$ of Expressions and are performed by the same adder.

In FIG. 14, the input signals of the Y, U and V signals are denoted by 1401y, 1401u and 1401v, respectively. The output signals of the R, G and B signals are denoted by 1418r, 1418g and 1418b, respectively. These input and output signals are each given in eight bits. Reference numeral 1404 is an eight-bit input of a constant 74h; 1405 is a two's complement eight-bit input of a constant BFh; and 1406 is a two's complement eight-bit input of a constant E5h. Reference numerals 1407 through 1417, 1419 through 1427, and 1433 are adders and 1428 through 1431 and 1437 through 1450 are temporary storages. In this setup, the temporary storages 1440 through 1450 are generically called temporary storage group 1451, the temporary storages 1428 through 1431 are likewise called temporary storage group 1452, and the temporary storages 1437 through 1439 are called temporary storage group 1453. Reference numerals 1434 through 1436 are limiters and 1454 is a carry input.

The adder 1440 is an eight-bit adder that adds the Y input signal 1401y and the result of V/(2⁶) (shifting right 6 bits the V input signal 1401v, a binary eight-bit data signal).

The adder 1407 is an eight-bit adder whose eight-bit output is latched by the temporary storage 1440. The carry need not be latched because it is always 0 according to the characteristics of the Y and V signals. The adder 1408 is an eight-bit adder that adds the Y input signal 1401y and the input constant 74h 1404. The eight-bit output of the adder 1408 plus a one-bit carry is latched by the temporary storage 1441.

The adder 1409 is an eight-bit adder that adds the Y input signal 1401y and the result of U/(2³). The eight-bit output of the adder 1409 together with a one-bit carry is latched by the temporary storage 1442. The adder 1410 is an eight-bit adder that adds the V input signal 1401v and the result of V/(2⁵). The eight-bit output of the adder 1410 is latched by the temporary storage 1443.

The adder 1411 is a four-bit adder that adds the results of V/(2⁴) and V/(2⁷). The four-bit output of the adder 1411 together with a one-bit carry is latched by the temporary storage 1444. The adder 1412 is an eight-bit adder that adds the result of V/(2²) and the two's complement of the constant BFh 1405. The eight-bit output of the adder 1412 is latched by the temporary storage 1445, with the carry ignored because it is always 0.

The adder 1413 is a six-bit adder that adds the results of V/(2³) and U/(2²). The six-bit output of the adder 1413 plus a one-bit carry is latched by the temporary storage 1446. The adder 1414 is a seven-bit adder that adds the results of V/(2¹) and U/(2⁷). The seven-bit output of the adder 1414 is latched by the temporary storage 1447.

The adder 1415 is a four-bit adder that adds the results of U/(2⁴) and U/(2⁶). The four-bit output of the adder 1415 together with a one-bit carry is latched by the temporary storage 1448. The adder 1416 is an eight-bit adder that adds the U input signal 1401u and U/(2⁵). The eight-bit output of the adder 1416 is latched by the temporary storage 1449. The adder 1417 is an eight-bit adder that adds the result of U/(2¹) and the two's complement of the constant E5h 1406. The eight-bit output of the adder 1417 is latched by the temporary storage 1450.

The adder 1419 is an eight-bit adder that adds the contents of the temporary storage 1440 and 1443. The eight-bit output of the adder 1419 along with a one-bit carry is input to the adder 1425 downstream. The adder 1420 is an eight-bit adder that adds the contents of the temporary storage 1444 and 1445. The eight-bit output of the adder 1420 is input to the adder 1425 downstream. The adder 1421 is a seven-bit adder that adds the contents of the temporary storage 1444 and 1447. The seven-bit output of the adder 1421 together with a one-bit carry is input to the adder 1426 downstream. The adder 1422 is a seven-bit adder that adds the contents of the temporary storage 1446 and 1448. The seven-bit output of the adder 1422 is input to the adder downstream. The adder 1423 is a nine-bit adder that adds the contents of the temporary storage 1442 and 1449. The nine-bit output of the adder 1423 plus a one-bit carry is input to the adder 1427 downstream. The adder 1424 is an eight-bit adder that adds the contents of the temporary storage 1448 and 1450. The eight-bit output of the adder 1424 is input to the adder 1427 downstream, with the carry ignored because it is always 0.

The adder 1425 is a nine-bit adder that adds the outputs from the adders 1419 and 1420 upstream. Since the eight-bit output of the adder 1420 is a negative number expressed in two's complement, the output is supplemented by 1 in its MSB (bit 9) upon input to the nine-bit adder 1425. The 10-bit output of the adder 1425, containing the nine-bit result of the addition and a one-bit carry, is latched by the temporary storage 1429. The adder 1426 is an eight-bit adder that adds the outputs from the adders 1421 and 1422 upstream. The eight-bit result of the addition by the adder 1426 is latched by the temporary storage 1430. The adder 1427 is a 10-bit adder that adds the outputs from the adders 1423 and 1424 upstream. Because the eight-bit output of the adder 1424 is a negative number expressed in two's complement, the output is supplemented by 1's in its bits 9 and 10 upon input to the 10-bit adder 1427. The 11-bit output of the adder 1427, containing the 10-bit result of the addition plus a one-bit carry, is latched by the temporary storage 1431.

The adder 1433 is a nine-bit adder that adds the contents of the temporary storage 1428 and an inverted value of the contents of the temporary storage 1430, the latter value being obtained by an inverter 1434. Inverting the contents of the temporary storage 1430 before input to the adder 1433 and adding 1 as the carry input 1454 to the latter are equivalent to adding the two's complement of the contents of the temporary storage 1430 to the adder 1433. The 10-bit output of the adder 1433 contains a one-bit carry. (If the carry is 0, the output is a negative number expressed in two's complement. If the carry is 1, the output is a positive number but the carry is ignored.) The limiters 1434, 1435 and 1436 output either 0 or 255 each. The value 0 is output by the relevant limiter if the contents of the temporary storage 1429, the results of the addition by the adder 1433, or the contents of the temporary storage 1431 constitute a value that is not expressed in eight bits and is less than 0. The value 255 is output by the relevant limiter if the temporary storage contents or the results of the addition constitute a value that is not expressed in eight bits and is more than 255.

In FIG. 14, reference numeral 1418r is an eight-bit R output signal, 1418g is an eight-bit G output signal, and 1418b is an eight-bit B output signal.

As described, the second example of the RGB converter utilizes the temporary storage 1451, 1452 and 1453 to absorb the input timing differences that stem from different numbers of input steps for each input value going to the adders downstream of the temporary storages. This scheme prevents the eventual output of those invalid results of additions which are temporarily output due to the input timing differences.

Furthermore, the temporary storages retain their previously latched values until they latch new results of additions. This means that it is possible to convert one set of the values on the input side of the temporary storage while converting a different set of values on the output side. Because the conversion processing is performed on a pipeline operation basis using the latch clock of the temporary storages, the maximum operating frequency of the conversion circuit may be raised. Where the number of temporary storages is increased and the latch clock frequency is raised, the operating frequency of the conversion circuit will be further enhanced.

Figure 5:
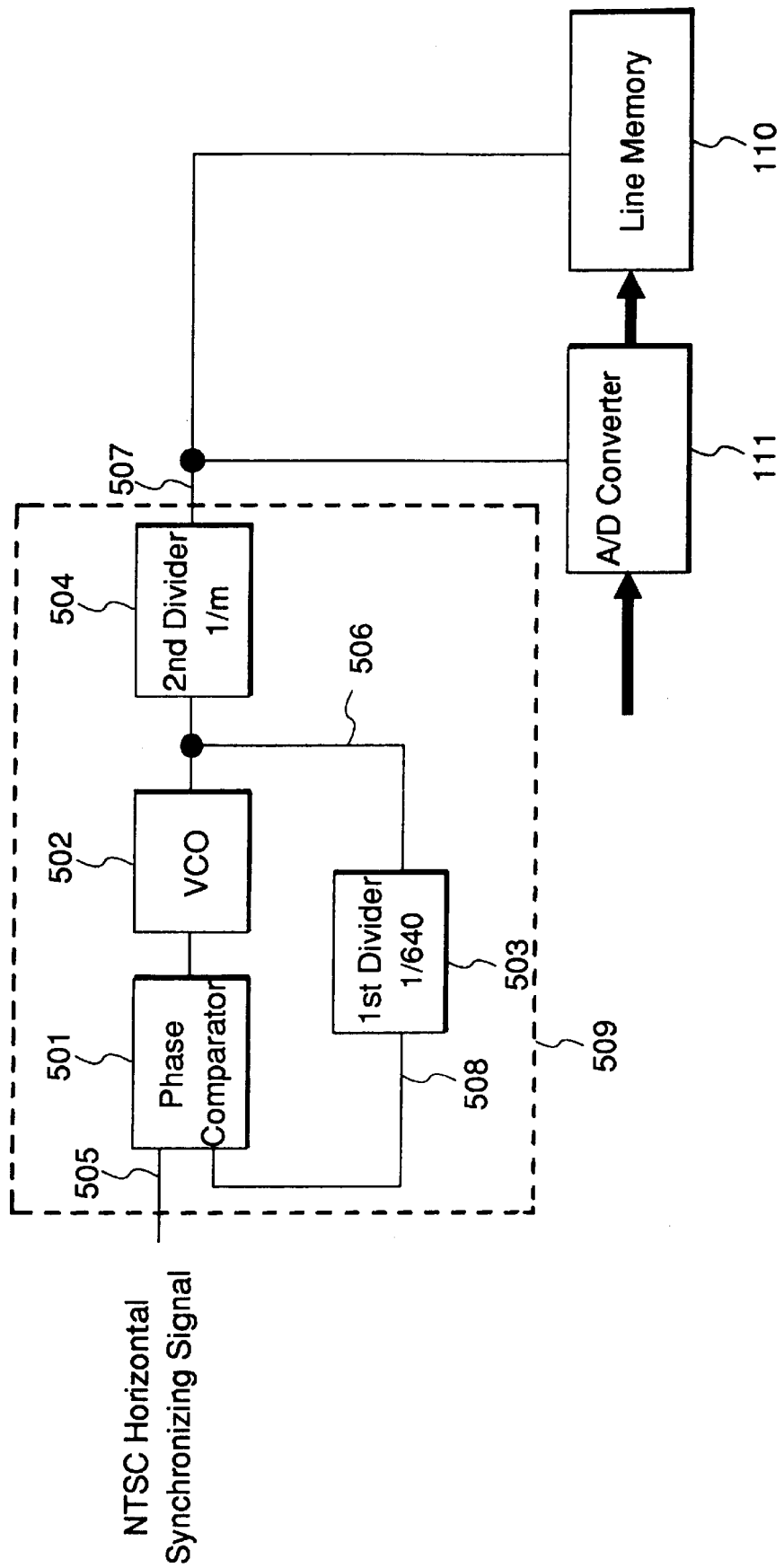
FIG. 5 is a detailed block diagram of a horizontal control portion of a display position/size controller according to the invention.

What follows is a detailed description of how the display position/size controller operates. The display position/size controller is intended to accomplish the second stated object of the invention. FIG. 5 is a block diagram of a horizontal control portion of the display position/size controller, the portion including the sampling clock of the A/D converter 111 and the write clock generator of the line memory 110.

In FIG. 5, a PLL (phase locked loop) circuit 509 comprises a phase comparator 501, a VCO (voltage controlled oscillator) 502, a first divider 503 and a second divider 504. The PLL circuit 509 causes the VCO 502 to oscillate in a way that matches a reference signal 505 with a referenced signal 508 in phase and frequency. When the first divider 503 is set for 1/n, the VCO 502 oscillates at a frequency times that of the reference signal 505. The second divider 504 subjects a VCO output signal 506 to a 1/m division, that may be set from the outside. Varying the value allows the frequency of a PLL output signal 507 to be changed as desired while the VCO 502 is kept in synchronism with the reference signal 505.

In the setup of FIG. 5, a horizontal synchronizing signal extracted from the NTSC composite signal is input to the reference signal 505. The resulting signal is called the NTSC horizontal synchronizing signal 505. The value for the first divider 503 is set to 640. This value is the number of effective display pixels in the NTSC composite signal. Thus the VCO output 506 per horizontal period synchronizes with the horizontal synchronizing signal of the NTSC composite signal, and the frequency of the VCO output 506 is 640 times that of the NTSC composite signal. This is a clock rate that permits sampling of 640 pixels per horizontal period of the NTSC composite signal.

If the value is varied so as to lower the sampling frequency, then reduces the number of sampled pixels per horizontal period of the NTSC composite signal is reduced, i.e., the pixel data count in the horizontal direction lowered.

Figure 6:
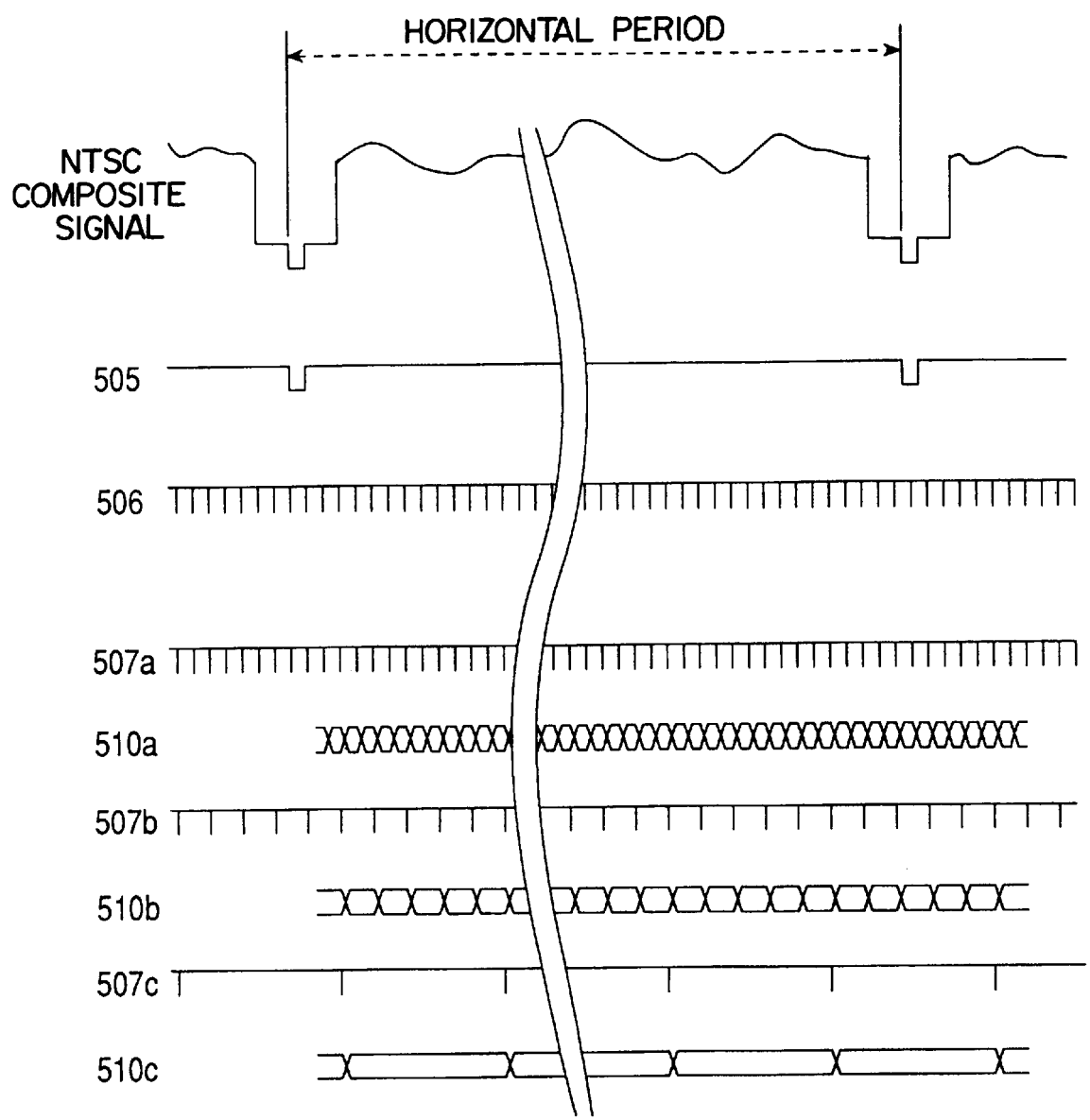
FIG. 6 is a timing chart showing in signal waveforms how the elements of FIG. 5 operate.
Figure 7:
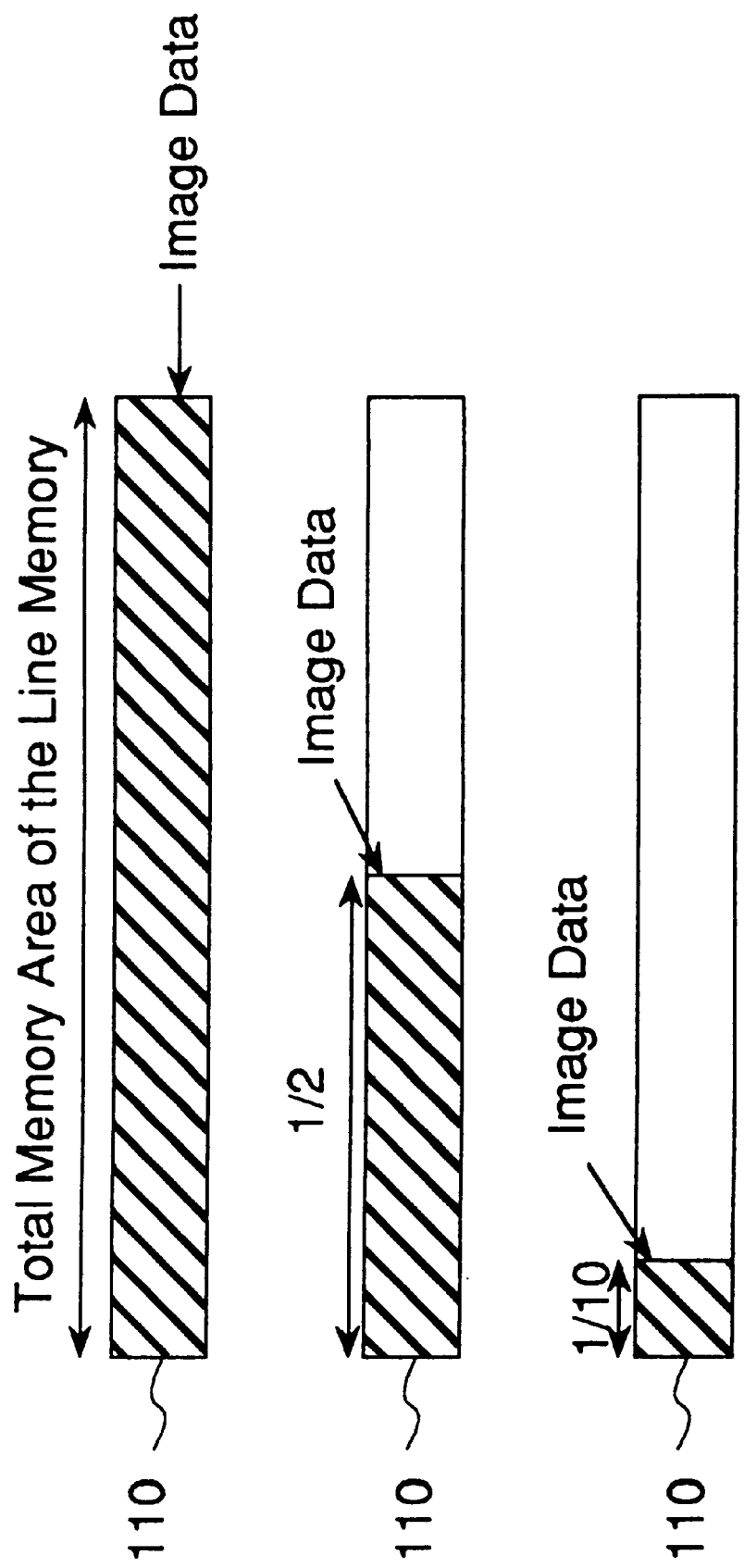
FIG. 7 is a view depicting how the interior of the line memory in FIG. 5 is illustratively constructed.

FIG. 6 is a timing chart showing how the NTSC composite signal 601, the NTSC horizontal synchronizing signal 505 and the output signal 507 behave in the PLL circuit 509 of FIG. 5. Referring to FIG. 6, signals 507a, 507b and 507c are output by the PLL circuit 509 when the dividing ratio of the second divider 504 is 1/1, 1/2 and 1/10, respectively. The PLL output signals 507a, 507b and 507c have clock rates that are respectively 640 times, 320 times and 64 times the frequency of the NTSC horizontal synchronizing signal 505. Analog-to-digital conversion based on these clock rates provides data of 640, 320 and 64 pixels per horizontal period, as represented by sample data 510a, 510b and 510c in the figure. The image data thus sampled per horizontal scan are written to the line memory 110 using the same clock rate as in sampling. This results in letting the image data occupy the total memory area of the line memory 110 respectively at rates of 1/1, 1/2 and 1/10 (for 510a, 510b, 510c), as illustrated in FIG. 7.

The image data of one horizontal scan held in the line memory 110 are read therefrom in asynchronism with the write timing and are written to the display memory. Because the data are written to the display memory at a constant timing, the data directed thereto includes the exact amount of the sampled pixels.

Figure 8:
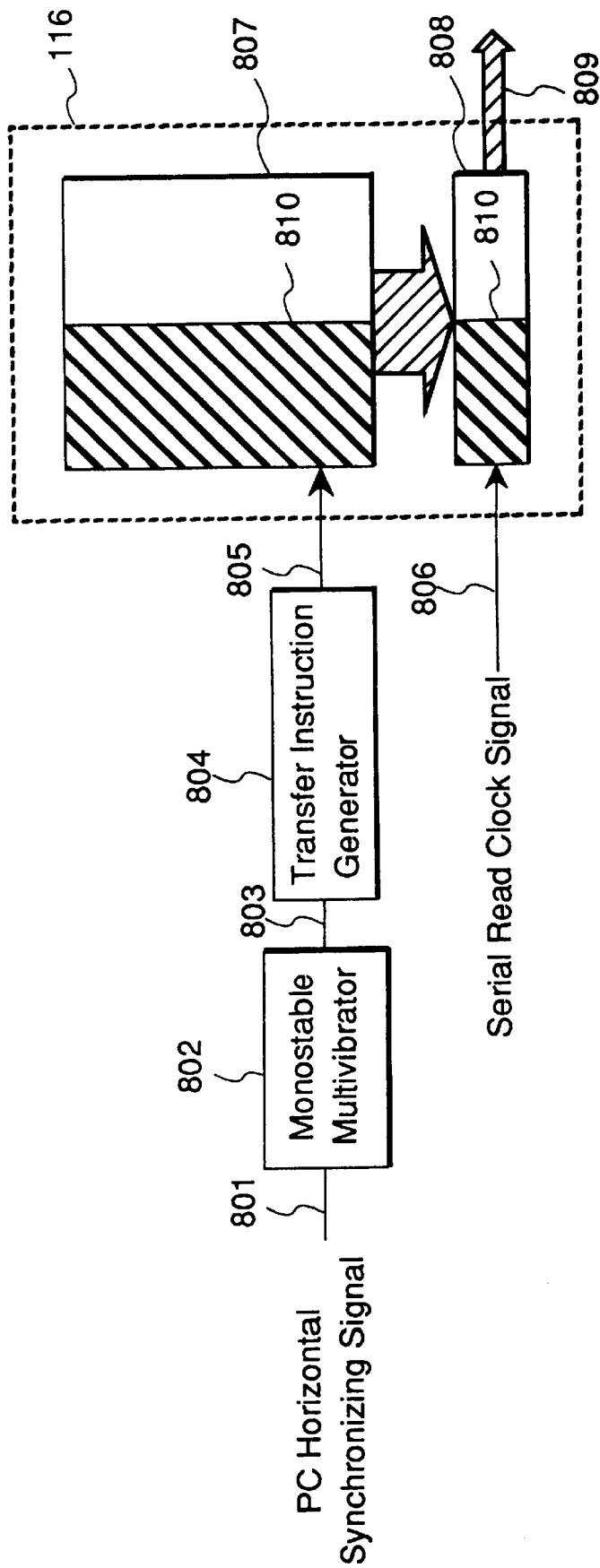
FIG. 8 is a detailed block diagram of a display memory write controller according to the invention.
Figure 9:
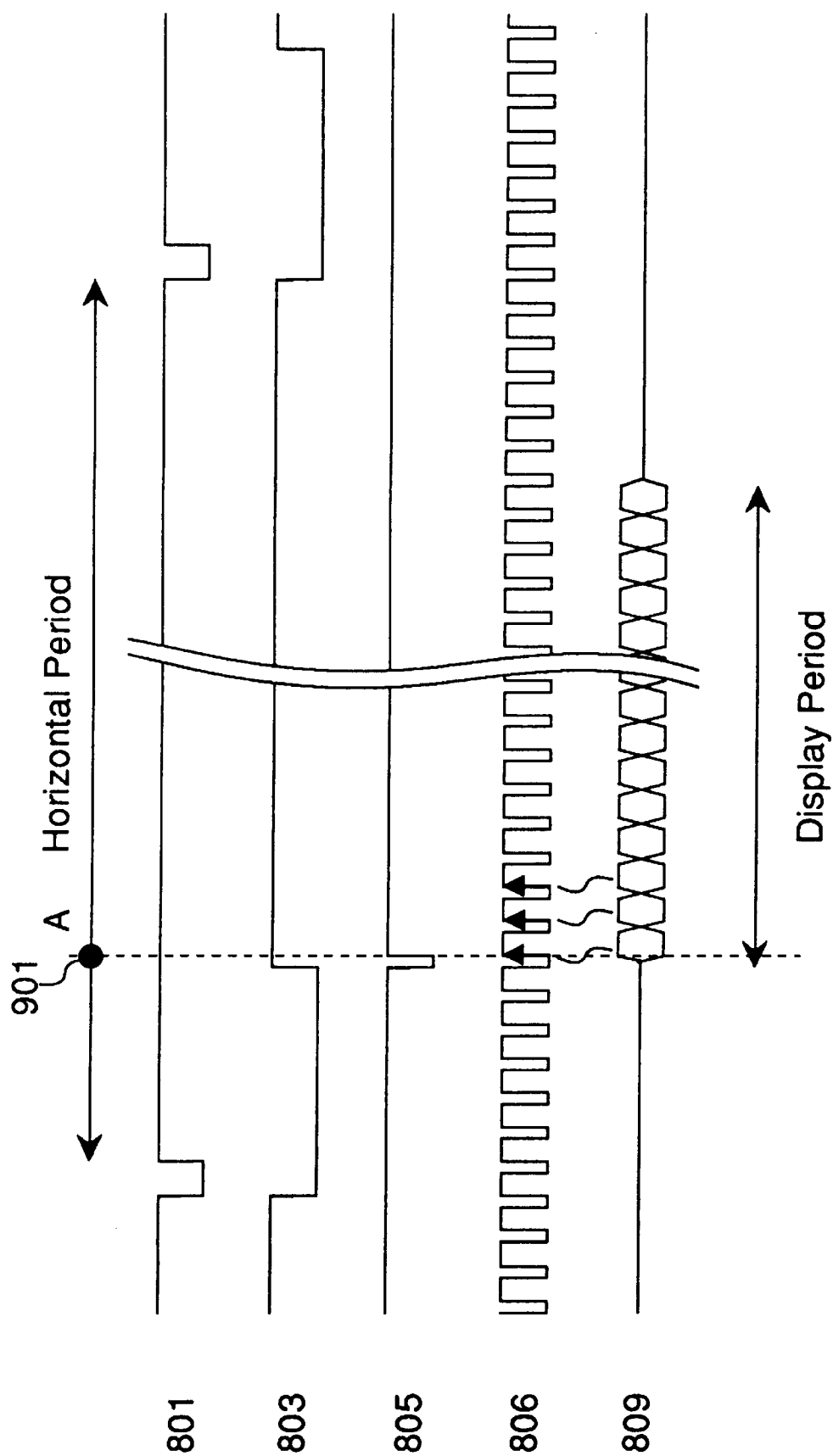
FIG. 9, is a timing chart showing in signal waveforms how the elements of FIG. 8 operate.

What follows is a description of the display position control effected by the display position/size controller in the horizontal direction. FIG. 8 is a detailed block diagram of the display memory write controller 115, showing how image data are written in the display memory 116. FIG. 9 is a timing chart in effect when data is read from the apparatus of FIG. 8 for display.

In FIG. 8, the shaded portions 810 in a memory array 807 and in a serial port 808 of the display memory 116 represent the image data of the sampled pixels. Reference numeral 801 is a PC horizontal synchronizing signal, 802 is a monostable multivibrator, 803 is an output signal of the monostable multivibrator 802 and 804 is a transfer instruction generator that generates a transfer instruction for use by the display memory 116 upon detection of a leading edge of the output signal 803. 805 is the transfer instruction 806 is a serial read clock signal by which to read data from the display memory 116 via a serial port 808 and 809 is serial image data that is read out of the serial port 808.

The monostable multivibrator 802 is a circuit whose output state is inverted upon trigger input from the outside, the inverted output state being arranged to revert to the original state upon elapse of a predetermined period of time. The period of time between inversion of the output state and reversion to the original state may be set as desired from the outside.

On receiving a transfer instruction from the transfer instruction generator 804, the display memory 116 transfers one-line data dictated by a separately furnished line address from the memory array 807 to the serial port 808. The one-line image data transferred to the serial port 808 is then read out according to the serial read clock signal 806. The serial read clock signal 806 is provided by the PC's dot clock so as to synchronize the serial image data with the display data of the PC.

The operations above are illustrated in terms of signal waveforms in the timing chart of FIG. 9. In FIG. 9, the pulse width of the horizontal synchronizing signal 801 may be changed to provide the output signal 803 of the monostable multivibrator 802 in accordance with the time setting of the latter. In this case, the transfer instruction 805 is output as shown when a leading edge of the monostable multivibrator output signal 803 is detected. Upon receipt of the transfer instruction 805, the display memory 116 transfers one-line data dictated by a separately furnished line address, not shown, to the serial port 808. From the serial port 808, the data transferred thereto as per the serial read clock signal 806 following the transfer instruction 805 is output therefrom in a consecutive manner.

The data thus read from the serial port 808 in units of lines is displayed, starting from point A (901 in FIG. 9) of the horizontal display period, by the amount of the pixel data in the display memory.

Figure 10:
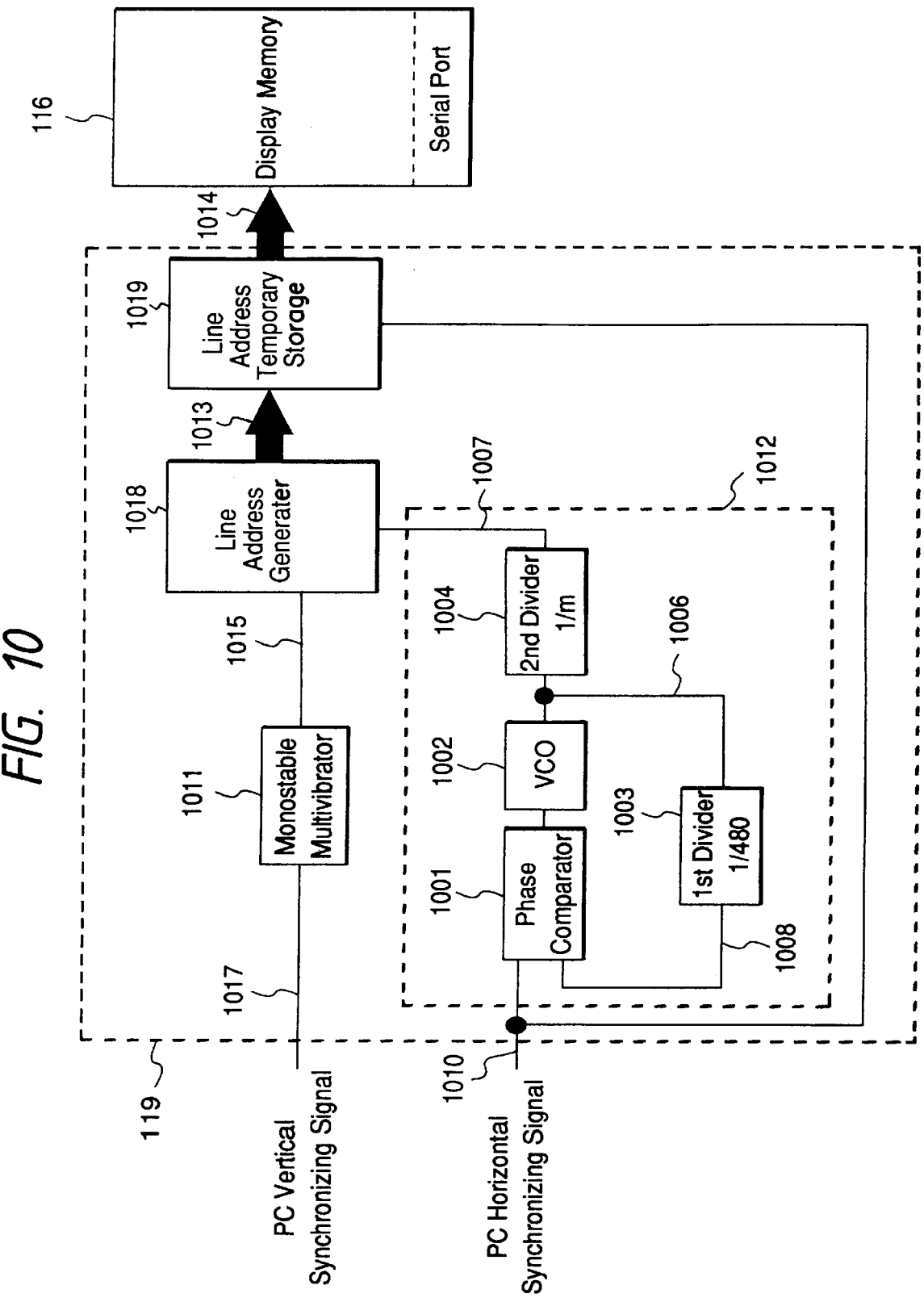
FIG. 10 is a detailed block diagram of a vertical control portion of a display position/size controller according to the invention.

FIG. 10 is a detailed block diagram of a vertical control portion of the display position/size controller. In FIG. 10, reference numeral 1012 is a PLL circuit that generates a clock signal 1007 for line address generation by line address generator 1018 for read and display operation; 1018 is the line address generator; 1019 is line address temporary storage for temporarily storing a line address 1013 generated by the line address generating means 1018 and for generating a memory address 1014; 1015 is a reset signal by which to reset the address generation of the line address generator 1018; and 1011 is a monostable multivibrator. The monostable multivibrator 1011 is used to change the pulse width of the vertical synchronizing signal and thereby to vary the reset position of the line address generator 1018. A horizontal synchronizing signal 1010 provides the reference signal of the PLL circuit 1012 as well as the latch clock signal for the line address temporary storage 1019. In this setup, the PC horizontal synchronizing signal is utilized as the signal 1010 whereby each line address is sent to the display memory after conversion to the timing of PC display and read operation. The signal will be hereinafter called the horizontal synchronizing signal 1010.

The PLL circuit 1012 generates the line address generation clock signal 1007 based on the PC horizontal synchronizing signal. The construction of the PLL circuit 1012 is basically the same as that of the PLL circuit 509 in FIG. 5.

With the PLL circuit 1012, the dividing ratio of a first divider 1003 is determined as follows. Suppose that the number of vertical display pixels for the PC is 1024. The number of effective vertical pixels in the NTSC composite signal is 480, and the display memory contains 480 lines of image data. The frequency for reading data from the display memory in the line direction is maximized when the vertical display size is minimized (i.e., reduced to a single line). In this case, it suffices to generate addresses for reading 480 lines per period of one-line display on the PC. This is a frequency 480 times that of the PC horizontal synchronizing signal. Therefore the PC horizontal synchronizing signal is input as the reference signal, with the value set to 480, so as to operate the PLL circuit 1012. If it is desired to maximize the vertical display size on the display unit, the frequency for read operation is reduced to 1/1024 given the assumption that the vertical display pixel count of the PC is 1024. Thus where the vertical display size is varied as desired between minimum and maximum, the frequency for read operation in the line direction is varied by a second divider 1004 between 1/1 and 1/1024.

The line address generation clock signal 1007 thus generated is used by the line address generator 1018 to generate the line address 1013. The address is latched by the line address temporary storage 1019 using the horizontal synchronizing signal 1010 and is forwarded to the display memory.

Figure 11:
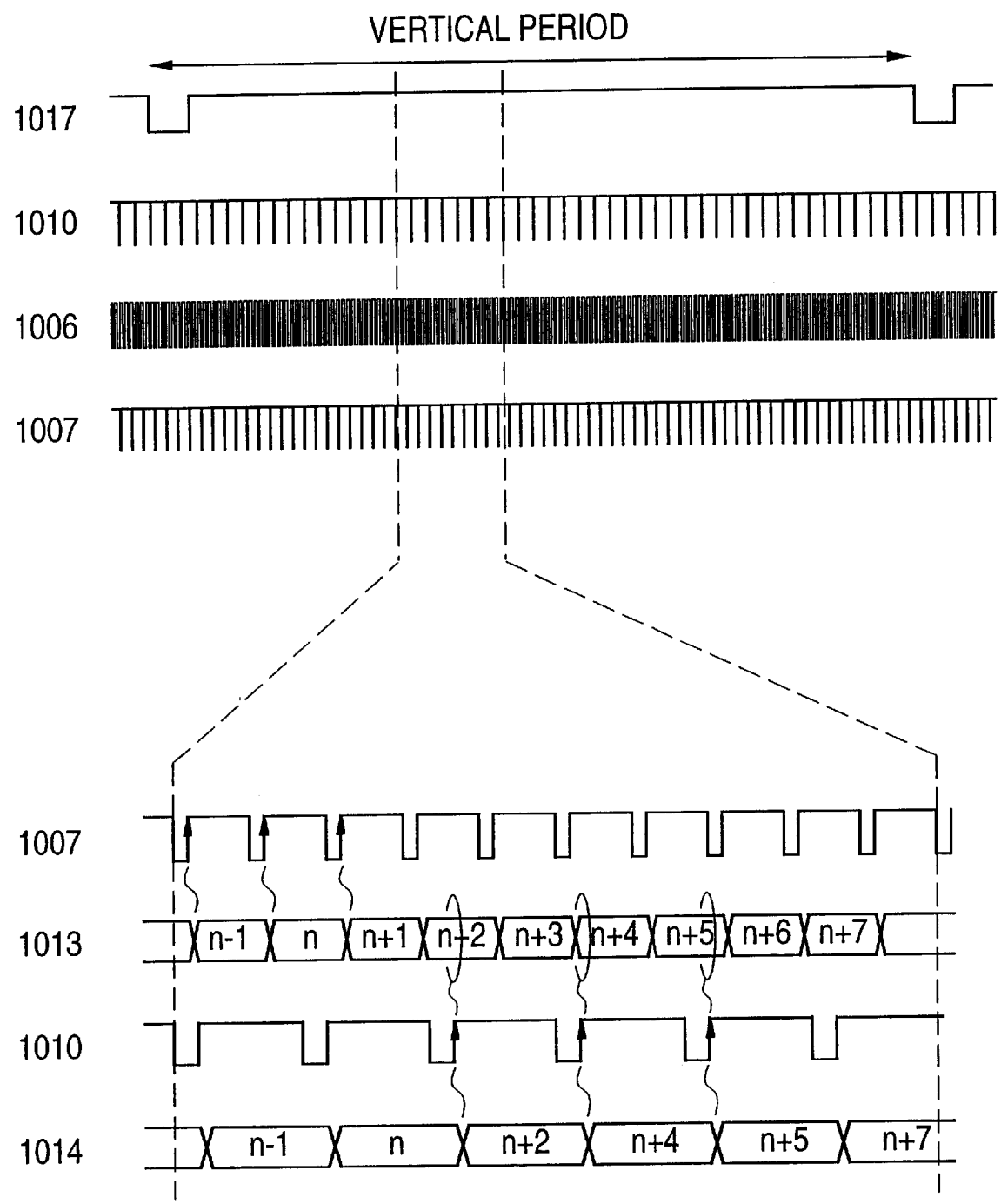
FIG. 11 is a timing chart showing in signal waveforms how the elements of FIG. 10 operate for display size control.

The operations above are illustrated in terms of signal waveforms in the timing chart of FIG. 11. This timing chart applies when image data are displayed across ⅓ of the vertical size of the display screen and when the dividing ratio of the second divider is 341(m=1024/3=341). As a result, the line address generation clock signal has a frequency 1.4 times that of the horizontal synchronizing signal (480×1/341=1.4).

In FIG. 11, reference numeral 1010 is the PC horizontal synchronizing signal, 1008 is a referenced signal, 1006 is a VCO output clock signal, 1007 is the line address generation clock signal, 1013 is the line address and 1014 is the memory address.

Because the line address 1013 is generated by use of the line address generation clock signal 1007, the address takes on continuous values such as n, n+1, n+2, etc. With the line address 1013 latched using the horizontal synchronizing signal, the memory address 1014 takes on discrete values such as n, n+2, n+4, etc., as shown in FIG. 11. That is, lines are thinned out when read out. In this manner, the vertical display size is reduced to ⅓ of the full size on the display unit.

Figure 12:
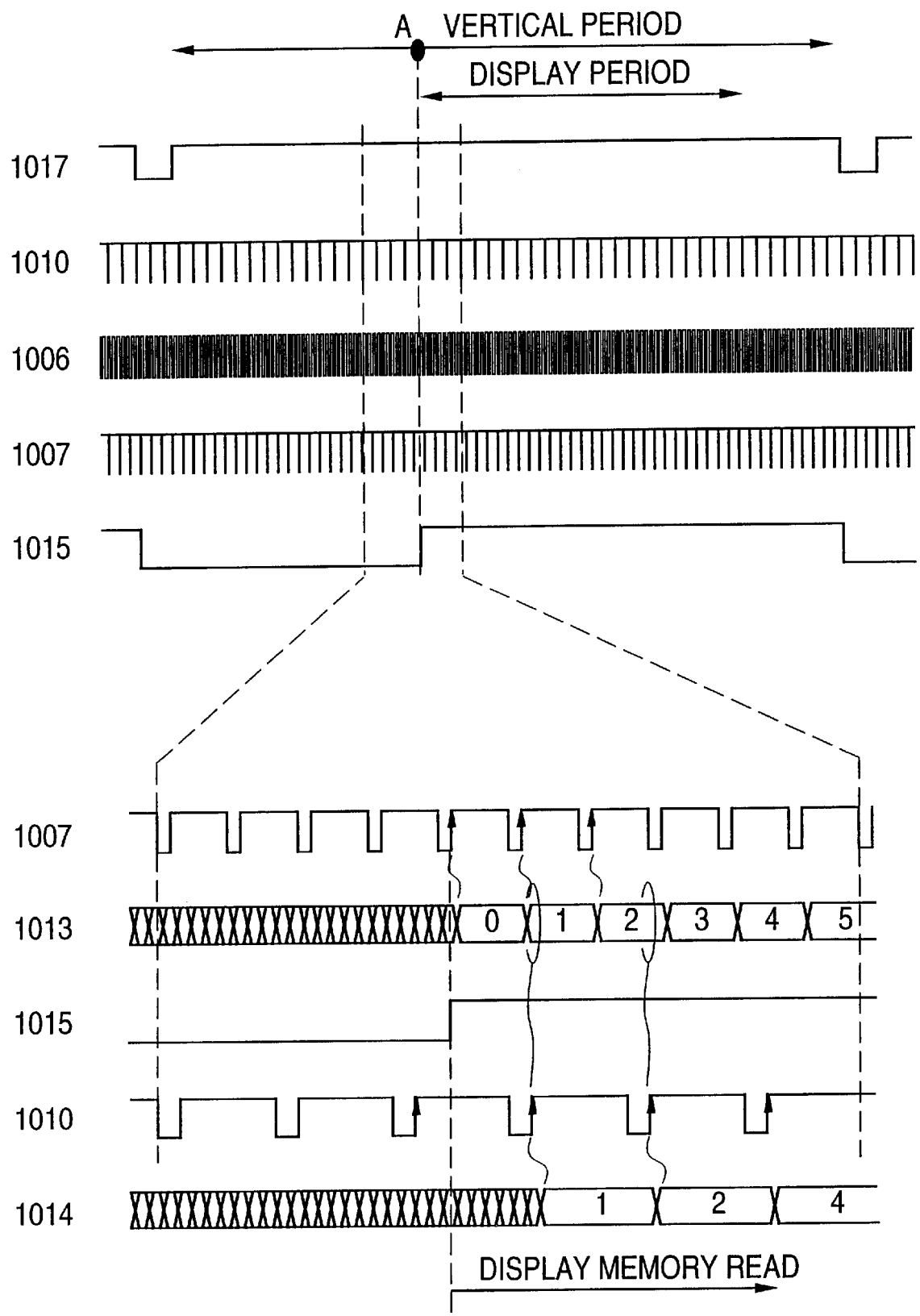
FIG. 12 is a timing chart showing in signal waveforms how the elements of FIG. 10 operate for display position control.

Below is a description of display position control effected by use of the reset signal 1015 of the line address generating means 1018 with reference to FIG. 12. FIG. 12 is a timing chart illustrating how display position control is effected by the setup of FIG. 10. In FIG. 12, the reset signal 1015 is generated as shown by the monostable multivibrator 1011 varying the pulse width of the vertical synchronizing signal 1017. The line address generator 1018 is reset when the reset signal 1015 is at the low level. That is, line address generation is started by use of the line address generation clock signal 1007 following a leading edge of the reset signal 1015. The line address 1013 shown in FIG. 12 is generated in this way. After being generated at a leading edge of the reset signal 1015, the line address 1013 is latched using the horizontal synchronizing signal 1010 and is sent as the memory address 1014 to the display memory. From this point on, the first line and subsequent lines of the image data are read from the display memory for display starting from point A of a vertical display period 1201.

What follows is a description of typical ways in which the display memory is constructed and controlled so as to achieve the third stated object of the invention.

Figure 19:
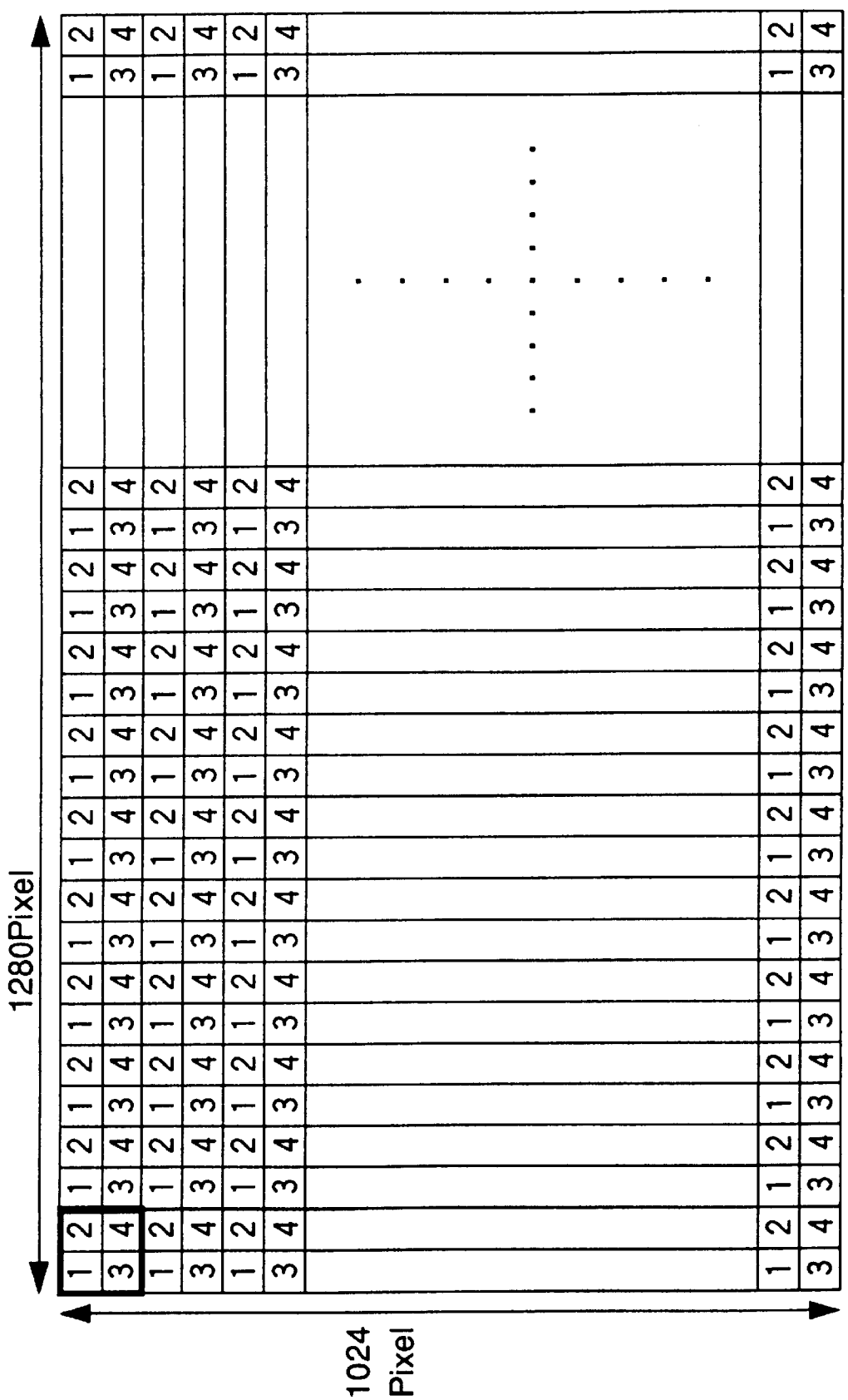
FIG. 19 is a view showing how the inventive display memory illustratively corresponds to the screen of display of the invention.

FIG. 19 is a view showing how the display memory illustratively corresponds in constitution to the screen of the display. It is assumed here that the screen size is 1280 pixels by 1024 pixels. In FIG. 19, each box in the conceptual lattice structure of the memory represents one pixel. The numerals in the boxes are the numbers of display memory IC's. These numbers are added for explanatory purposes. Every four pixels enclosed by thick lines (two pixels by two pixels) are regarded as one block. The pixels in each block are each assigned a different display memory IC. Where the display memory IC arrangement is not expanded, each block includes only one pixel (No. 1). Where the display memory IC arrangement is expanded, each block includes the three additional pixels (Nos. 2 to 4).

The display memory IC arrangement is expanded to include the pixels 2 through 4 as follows. Initially, image data is written only to the pixel No. 1 in each block. From the viewpoint of the CPU or its equivalent, not shown, which writes image data to the memory, the memory address is the same for the pixels 1 through 4. With the pixels each assigned a different memory IC, writing data to the pixel 1 means writing the same data simultaneously to the pixels 2 through 4 as well.

When the display memory IC arrangement is not expanded, only the pixel 1 in each block is assigned a display memory IC. Whether or not memory expansion is in effect, image data is written to the pixel 1 alone in each block of the display memory. Thus the same kind of write control may apply regardless of memory expansion being in effect or not.

Figure 20:
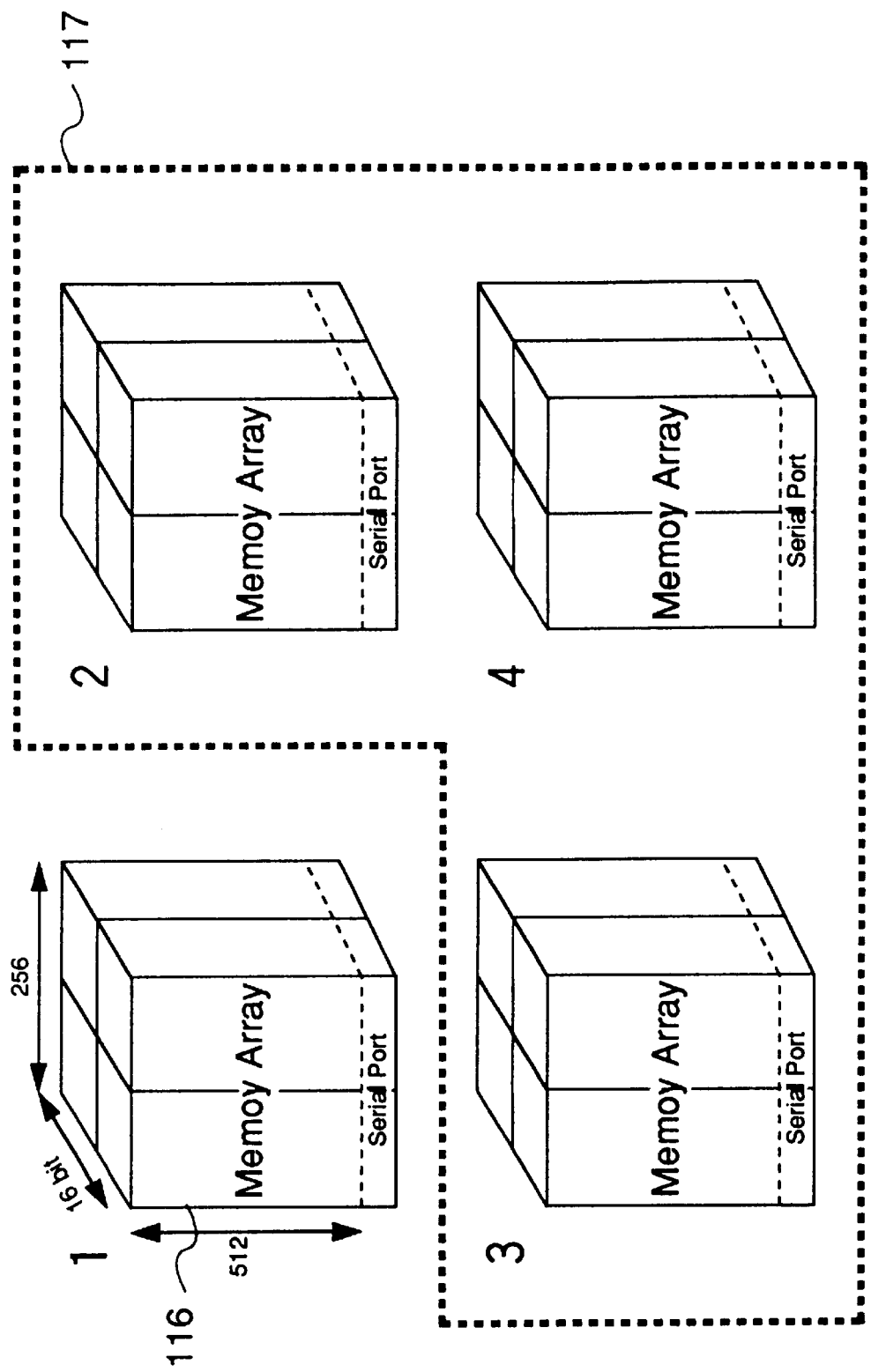
FIG. 20 is a schematic view of a typical display memory arrangement according to the invention.

FIG. 20 is a schematic view of a typical display memory IC arrangement. In FIG. 20, one display memory IC illustratively has a capacity of 128 kilowords by 8 bits (i.e., 256×512×8 bits). Four such display memory IC's provide a capacity for accommodating ¼ of the full screen size, i.e., 320×512 pixels, each pixel representing 16 bits of image data. The 16-bit data width is employed to have the Y, U and V signals stored in a format of eight bits, four bits and four bits, respectively. This is one of the commonly utilized image data recording formats in which to process image data.

The display memory 116 stores the image data assigned to the pixel 1 of each of the blocks. The expanded display memory 117 accommodates the data assigned to the pixels 2 through 4 of each block.

Figure 15:
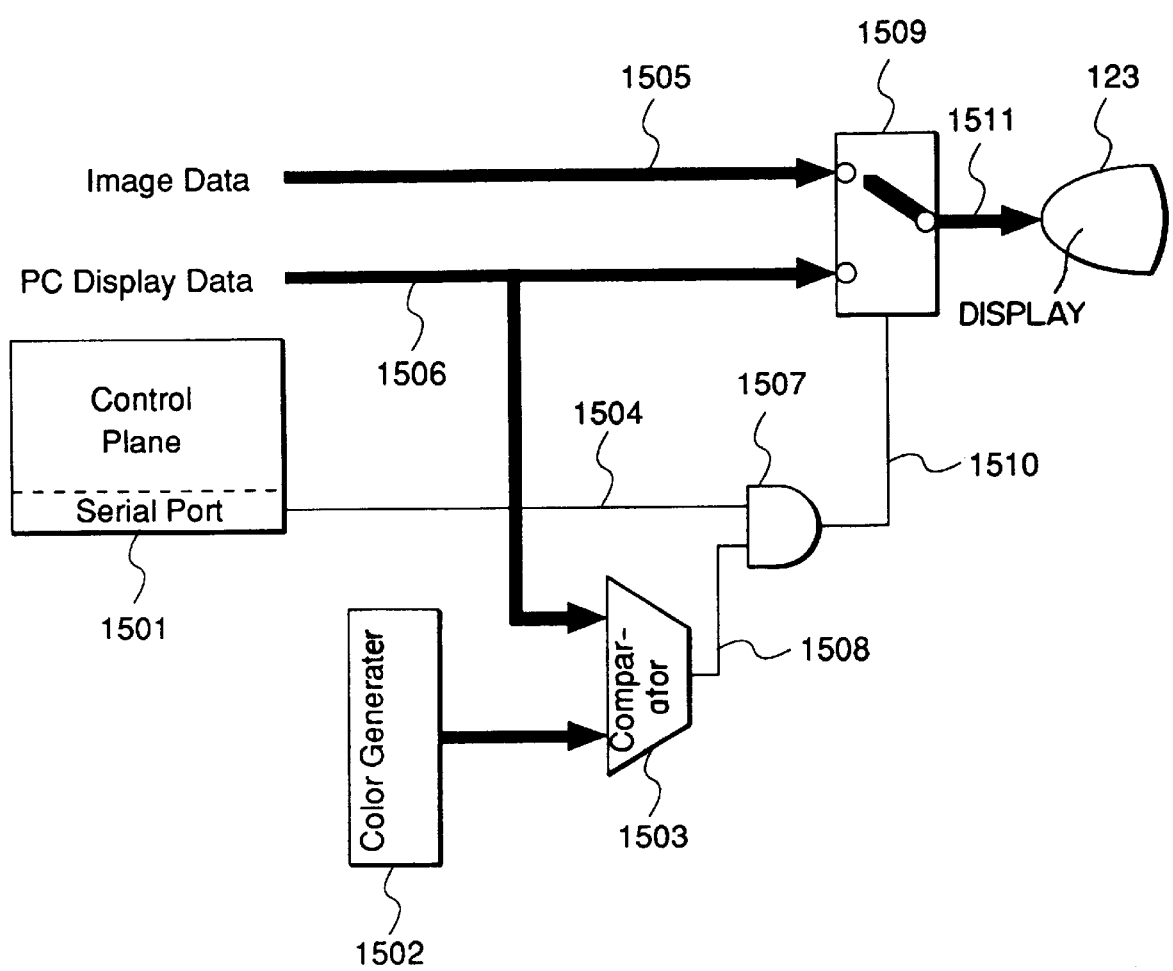
FIG. 15 is a block diagram of a display composing device according to the invention.

What follows is a description of how the invention with its novel keying feature is practiced to accomplish its fourth stated object. FIG. 15 is a block diagram showing a detailed construction of the display a composing device according to the invention. In FIG. 15, reference numeral 1501 is a control plane, 1502 is a color generator for determining that color of the PC display screen on which to superimpose an image, 1503 is a comparator for comparing the color data generated by the color generator 1502 with PC display data 1506 to detect a color coincidence therebetween and 1504 is composite area designating data that is read from the control plane 1501. 1505 is image data, 1506 is the PC display data, 1507 is an AND gate, 1508 is chromakey data that are output by the comparator 1503, 1509 is a display data switch, 1510 is a display data switching signal output by the AND gate 1507, and 1511 is display data.

As with common display memories, the control plane 1501 has its stored data elements corresponding to the pixels on the display screen on a one-to-one basis. The control plane is equipped with a serial port for read operation. Data is read from the control plane 1501 in the same manner as from the PC display memory, not shown. The serial port outputs the composite area designating data 1504.

The PC display data 1506, besides entering the display data switch, is also input to the comparator 1503. The comparator 1503 compares the color data generated by the color generator 1502 with the PC display data 1506. If a color coincidence is detected between the two kinds of data, the comparator 1503 outputs chromakey data 1508. It is assumed that when set to 1, the display data switching signal 1510 causes the image to be displayed, and that when set to 0, the signal 1510 allows the PC display to be displayed. It is also assumed that the color generated by the color generator 1502 is black.

As a first example, the composite area designating data 1504 are assumed to be 1, with the PC display data 1506 being black. In this state, the comparator 1503 detects a color coincidence between the PC display data 1506 and the color output of the color generator 1502, outputting 1 as the chromakey data 1508. Because its inputs are all 1's, the AND gates 1507 sets the display data switching signal 1510 to 1. This sets the display data switch 1509 to the position of the image data 1505, allowing the image data 1505 to be output as the display data 1511. The display data 1511 translate into the image on the display 123.

As a second example, the composite area designating data 1504 is assumed to be 1, with the PC display data 1506 being other than black. Such a state occurs when a graphic image of the PC or the like is to be superimposed on the currently displayed image. Because the PC display data is other than black, the comparator 1503 does not detect any color coincidence between its inputs, and outputs 0 as the chromakey data 1508. This causes the AND gate 1507 to output 0 as the display data switch 1510 that sets the display data switching means 1509 to the position of the PC display data 1506. The display 123 thus displays the PC display data.

As a third example, the composite area designating data 1504 are assumed to be 0, with the PC display data 1506 being black. Such a state occurs when a black display is in effect as the ordinary PC display. In this case, the comparator 1503 detects a color coincidence between its inputs, and outputs 1 as the chromakey data 1508. Because the composite area designating data 1504 are 0, the AND gate 1507 sets the display data switching signal 1510 to 0. This in turn sets the display data switch 1509 to the position of the PC display data 1506, allowing the PC display data 1506 to appear on the display 123.

As a fourth example, the composite area designating data 1504 are assumed to be 0, with the PC display data 1506 being other than black. In this example, the comparator 1503 obviously does not detect any color coincidence between its inputs, and outputs 0 as the chromakey data 1508. Thus the display data switching signal 1510 is 0 which causes the display data switch 1509 to select the PC display data position. This allows the PC display data 1506 to appear on the display 123.

Figure 16:
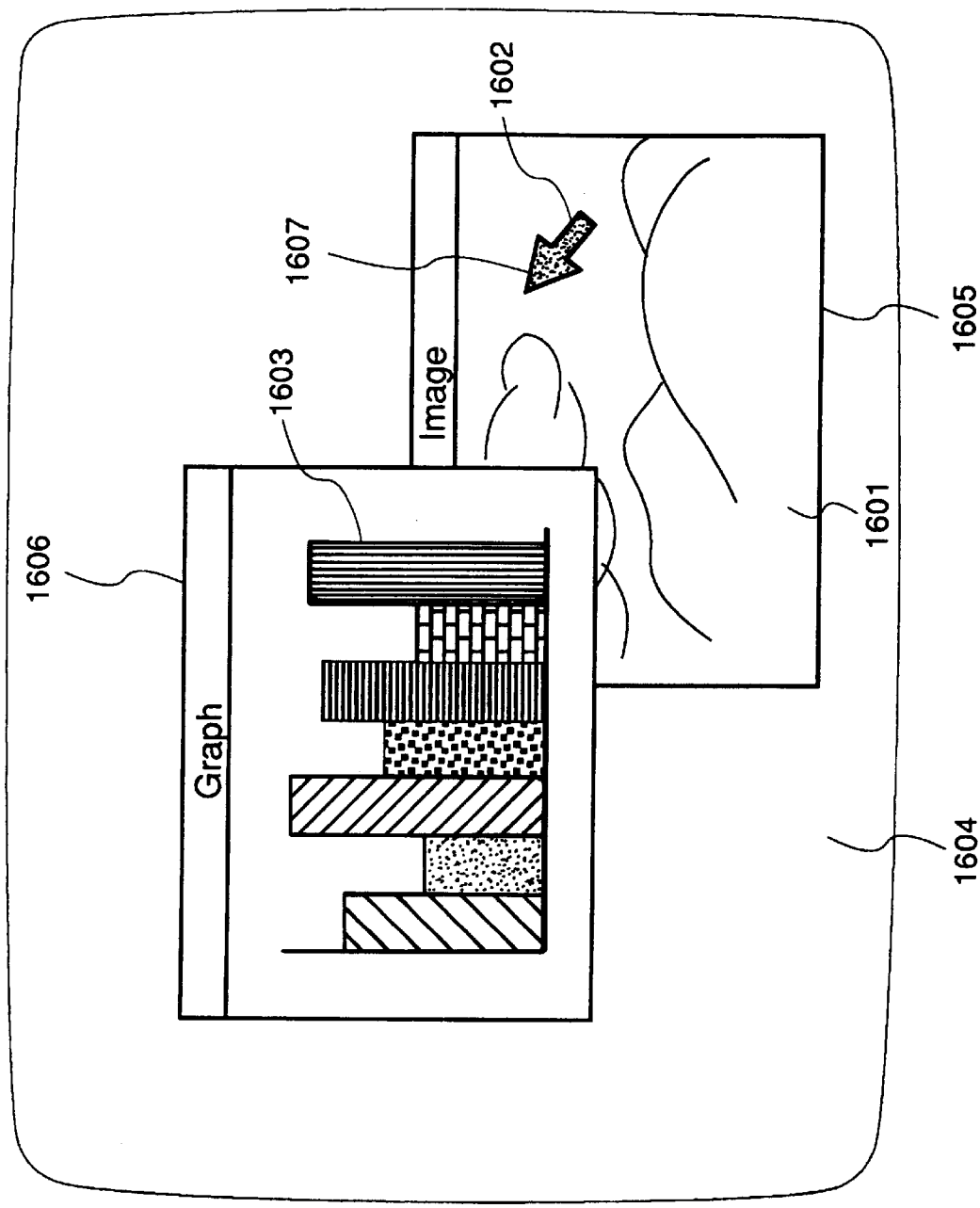
FIG. 16 is a view showing what appears illustratively on the screen of a display when the display composing device of FIG. 15 operates.
Figure 17:
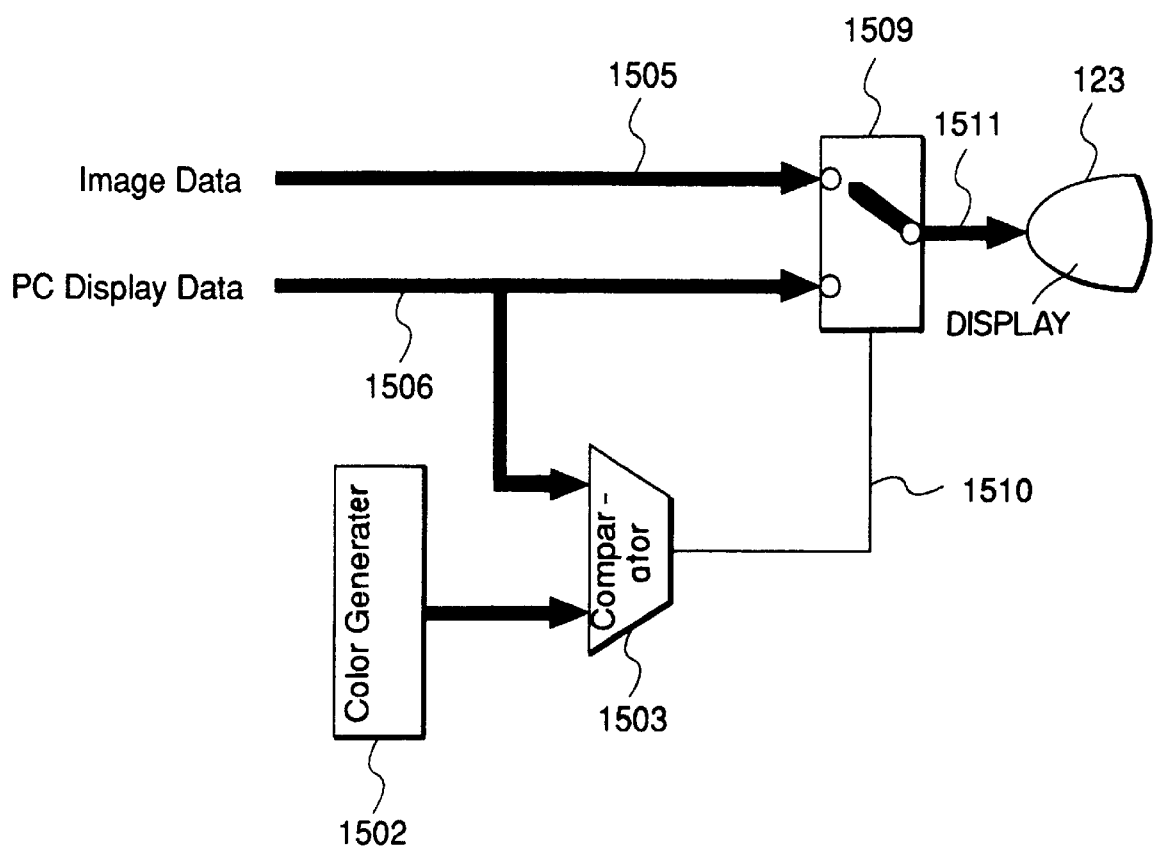
FIG. 17 is a schematic view of a prior art chromakey-based process.
Figure 18:
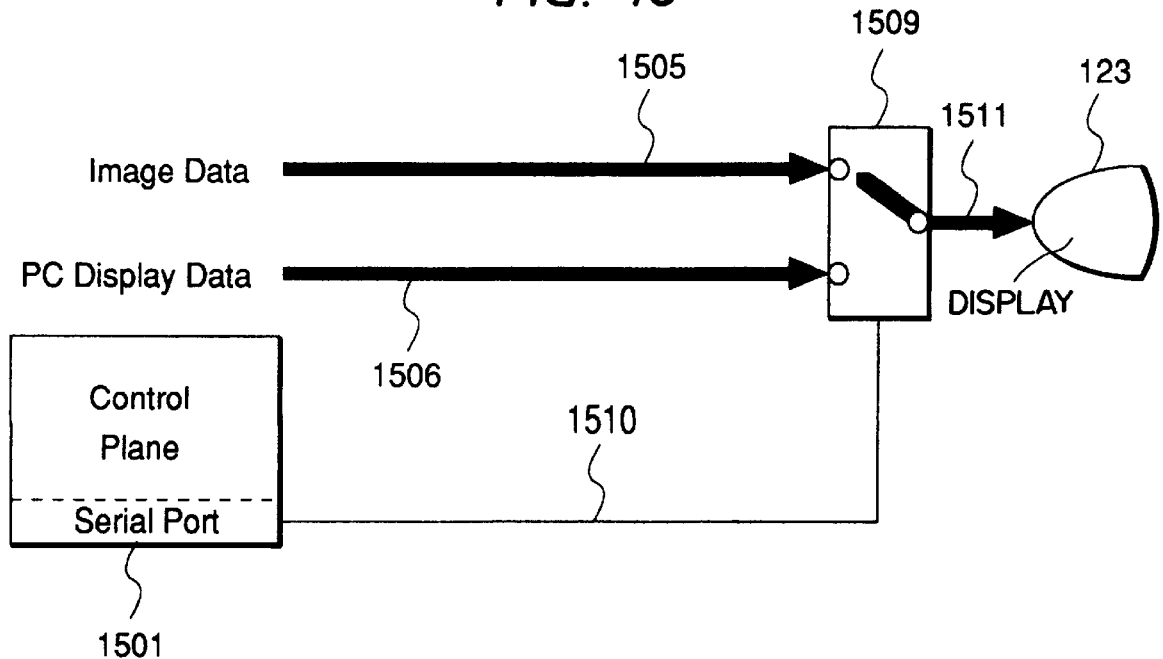
FIG. 18 is a schematic view of a prior art control plane-based process.

FIG. 16 shows what appears on the screen of the display 123 when the first through the fourth examples described above are executed. In FIG. 16, reference numeral 1605 is an image display window which is an application window, 1606 is another application window for graphic display and 1607 is a mouse cursor graphically displayed. Reference numeral 1601 indicates the state resulting from executing the first example, i.e., the state in which the composite area designating data is 1 and the PC display data constitute a black area, 1602 is the resulting state of the second example wherein the composite area designating data is 1 and the PC display data constitute an area other than black, 1603 is the resulting state of the third example wherein the composite area designating data is 0 and the PC display data constitute a black area and 1604 is the resulting state of the fourth example wherein the composite area designating data is 0 and the PC display data constitute an area other than black.

As described, the display composing device of the invention, even as it is implemented in the simplest possible structure, circumvents the prior art disadvantage of the image in a background window becoming visible through another window superimposed on that window, and eliminates the need, along with the processing overhead involved, for having to update as required the control plane in accordance with the superimposed graphics.

Described below is how the fifth stated object of the invention is accomplished illustratively by implementing the image splitting feature of the invention.

Figure 22:
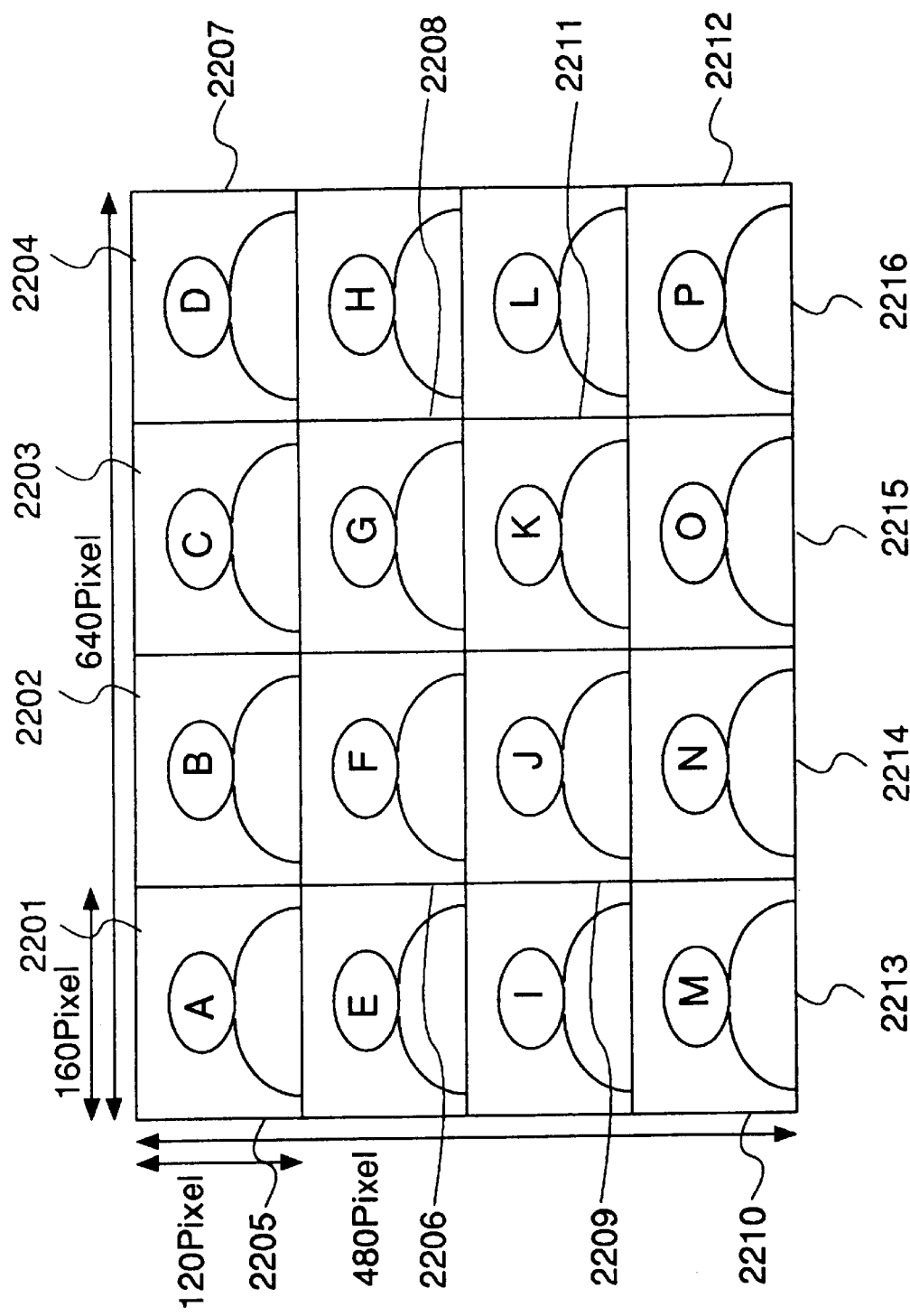
FIG. 22 is a view of a composite image made of individual images coming from a plurality of sources, the composite image being displayed on a terminal of a video conference system according to the invention.

FIG. 22 is a composite image of individual images coming from a plurality of sources. It is assumed that he composite image measures 640 pixels by 480 pixels and that each of 16 individual images making up the composite image measures 160 pixels by 120 pixels. Image data are input in the following order: The first line of an image A 2201 is input first, followed by the first line of an image B 2202, the first line of an image C 2203 and the first line of an image D 2204, in that order. Up to 120 lines are input in this manner. Then the first line of an image E 2205 is input, followed by the first line of an image F 2206, the first line of an image G 2207 and the first line of an image H 2208, in that order. The line input continues in like manner up to the 120th line in an image P 2216.

Figure 21:
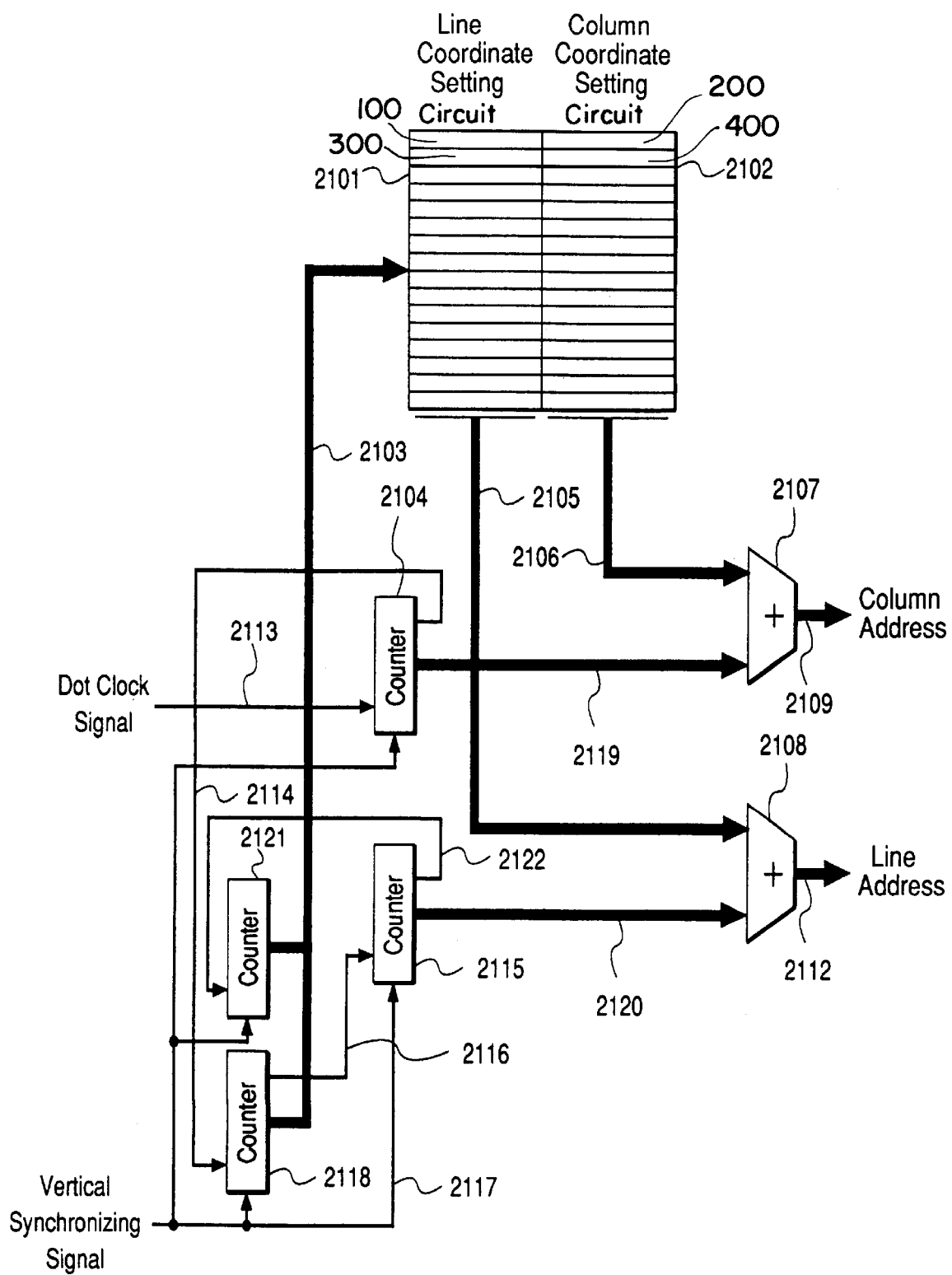
FIG. 21 is a block diagram of that portion of the invention which illustratively provides control over the split display of a composite image.

FIG. 21 is a block diagram of that portion of the invention which illustratively provides control over the split display of a composite image. In FIG. 21, reference numeral 2101 is line coordinate setting device for setting the display position coordinates of line pixels representative of each image coming from each of a plurality of sources, 2102 is column coordinate setting device for setting the display position coordinates of column pixels representative of each of the images from the multiple sources and 2104 is a counter that counts a dot clock signal 2113. A carry signal 2114 provided by the counter 2104, is output when the counter reaches 160, i.e., the pixel count in the horizontal direction of each individual image. A two-bit counter 2118 counts the carry signal 2114 of the counter 2104 and 2116 is a carry signal of the counter 2118, output when the number of images in the horizontal direction (i.e., 4) is counted.

2115 is a counter that counts the carry signal 2116 of the counter 2118, 2122 is a carry signal of the counter 2115, output when the counter reaches the number of pixels in the vertical direction of each image (i.e., 120) and 2121 is a two-bit counter that counts the carry signal 2122 of the counter 2115, the maximum count being 4, i.e., the number of individual images in the vertical direction. 2103 is the output of the counters 2118 and 2121, the high-order two bits coming from the counter 2121 and the low-order two bits from the counter 2118, the output serving as the address 2103 to the coordinate setting device.

2105 is line coordinates that are read from the line coordinate setting device 2101 and 2106 is column coordinates from the column coordinate setting device 2102. 2107 and 2108 are adders, 2109 and 2112 are a column address and a line address of the display memory, respectively and 2117 is the PC's vertical synchronizing signal used as reset signals to the counters 2104, 2115, 2118 and 2121; 2119 is the output of the counter 2104 and 2120 is the output of the counter 2115.

The setup of FIG. 21 operates as follows. When the vertical synchronizing signal of the PC is input, the counters 2104, 2115, 2118 and 2121 are all reset. The address 2103, which is set to 0, is sent to the line and column coordinate setting device 2101 and 2102. In turn, the line and the column coordinate setting device 2101 and 2102 output the line coordinates 2105 for line 0 and the column coordinates 2106 for column 0, respectively. The line and the column coordinates 2105 and 2106 are input to the adders 2108 and 2107, respectively. Suppose that the line coordinates 2105 stand for 100 and the column coordinates 2106 for 200.

What happens then is as follows. When the image data represent the pixel of line 0, column 0 of the image A, the counter 2104 counting the dot clock signal 2113 outputs 0. The value 0 is input to the adder 2107. As a result, the adder 2107 outputs a column address (2109) of 200. Meanwhile, the counter 2115 also provides an output (2120) of 0 which is input to the adder 2108. In turn, the adder 2108 outputs a line address (2112) of 100.

In the manner described, the image data of line 0, column 0 of the image A are written to the position of line 100, column 200 in the display memory. When the line 0 data are input for up to column 159, the data are written from the position of line 100, column 200 to the position of line 100, column 359 in the display memory. The counter 2104 outputs the carry signal 2114 to count up the counter 2118. This sets to 1 the address directed at the coordinate setting device, causing the coordinate setting device 2101 and 2102 to output respectively the line coordinates 2105 and column coordinates 2106 of the second image B. It is assumed here that the line coordinates 2105 stand for 300 and the column coordinates 2106 for 400. After being read out, the coordinates are input to the adders 2108 and 2107 in which they are added to the outputs 2120 and 2119 of the counters 2115 and 2104, respectively.

The image data of the second image B are written to the display memory from column 400 to column 559 in the same manner as with the first image A.

Similarly, the image data of line 0 in the fourth image D are written to the display memory for up to 160 columns. This causes the counter 2118 to output 0 and to send the carry signal 2116 to the counter 2115 to count up the latter. As a result, the address 2103 for the coordinate setting means returns to 0, causing the means 2102 and 2102 to output respectively the line coordinate 2105 and column coordinate 2106 of the image A. The counter 2115 outputs 1 (output 2120). This causes the data of line 1 of the image A to be written to line 101, column 200 in the display memory.

The first lines of the images A through D are then written to the display memory in the same manner as line 0. After the data of lines 0 through 119 have been written, the counter 2115 outputs the carry signal 2122 and returns to 0. The carry signal 2122 causes the counter 2121 to count up so that the latter will output 1. The address 2103 for the coordinate setting means becomes 3. This causes the coordinate setting device 2101 and 2102 to output the fourth line and column coordinates. Thereafter, the data write operation continues in the same manner as the writing of the image data of the first through the third images.

In the manner described, the image data representative of each of the individual images are written to the coordinates that are established by the coordinate setting means 2101 and 2102.

Figure 23:
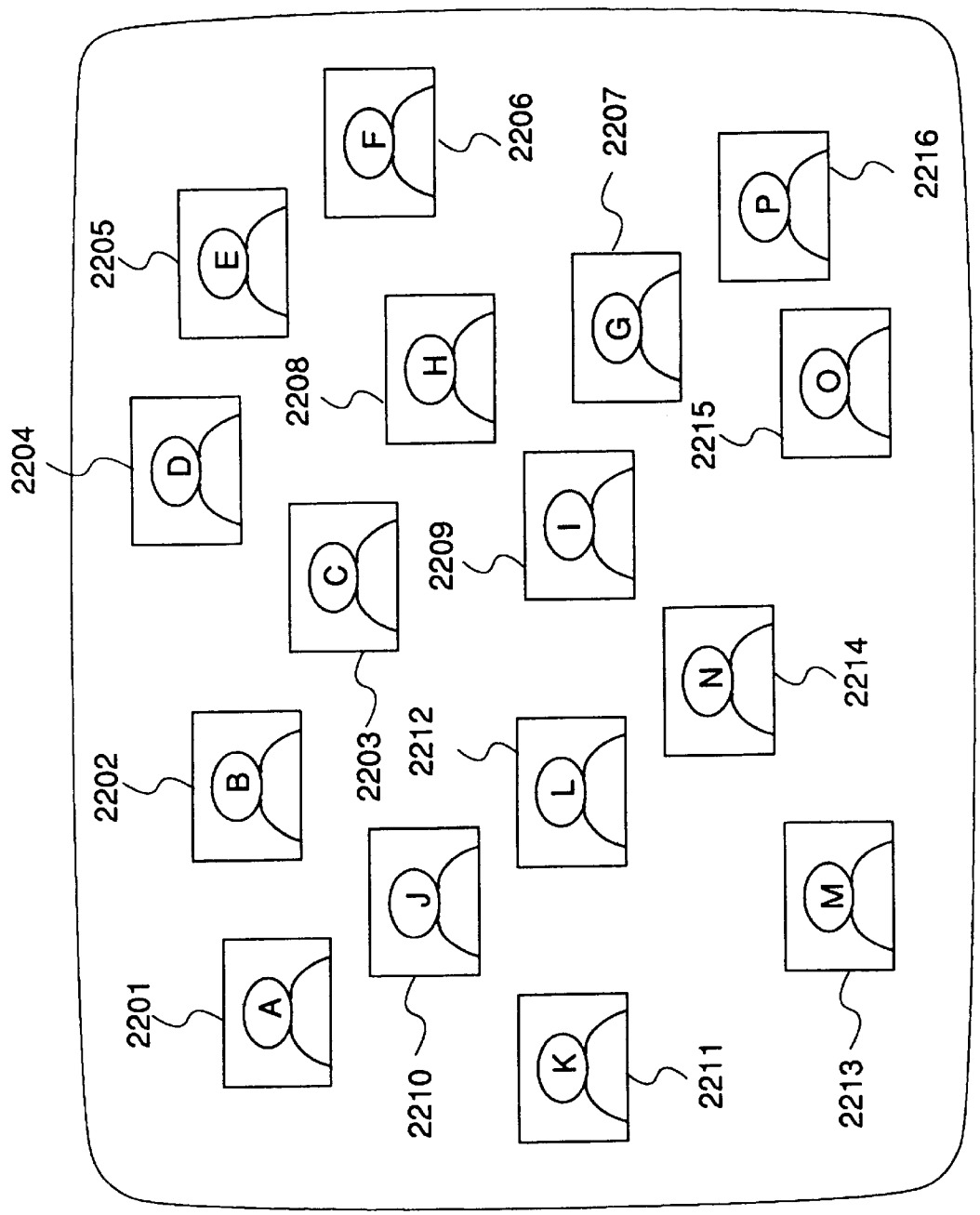
FIG. 23 is a view of a typical display screen that appears on a terminal, showing how the image splitting feature of the video conference system according to the invention operates.
Figure 24:
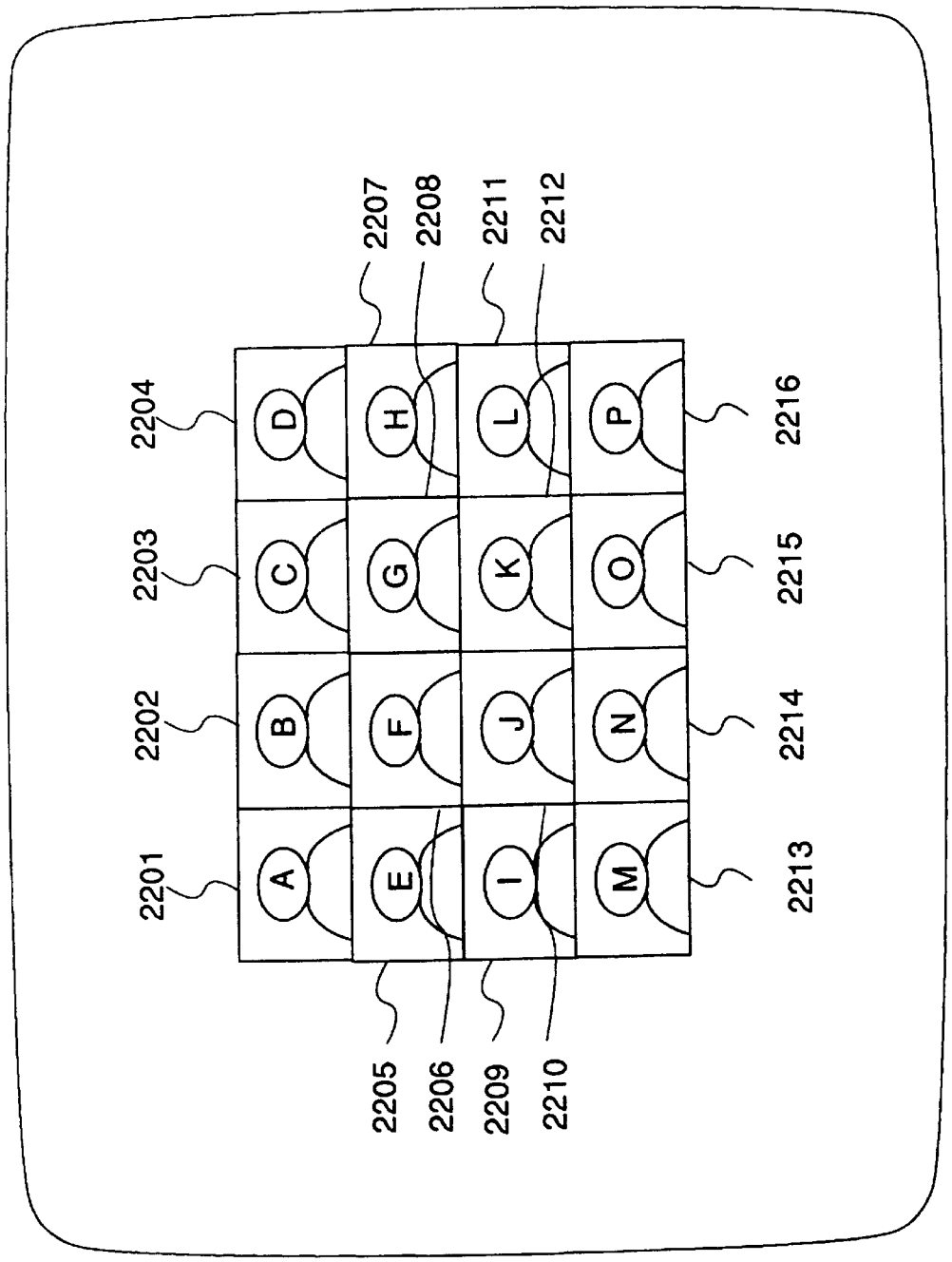
FIG. 24 is a view of a prior art display example generated by a prior art video conference system.

FIG. 23 is a view of a typical display screen that appears on a terminal, showing how the image splitting feature of the video conference system according to the invention works in practice. As illustrated, the composite image made up of a plurality of individual images coming from a plurality of sources is split into the original images. The split images are then displayed where desired on the screen.

As described, the image splitting feature of the invention splits the composite image comprising multiple individual images from various sources into the original images that are displayed where desired on the screen of each terminal. In a multi-window setup, the above-described keying method of the invention superimposes images on one another for display in a single window, whereby the video conference system based on that method becomes significantly easier to use.

As described, the information processing apparatus according to the invention permits easy expansion of functions without making redundant the existing resources incorporated therein. The user, having initially purchased the basic through-display board, may later add more functions thereto as needed. This makes it possible to construct a multimedia system much more economically than before.

Because individual images from external video apparatuses are displayed at desired positions and in desired sizes on the display unit of the PC, the intrinsic functions of the multi-window system used in conjunction with the multimedia information processing apparatus are not impaired in any way. The user feels interfaced naturally to the system.

In another aspect, the invention is capable of writing simultaneously to the display memory the image data of each block made of two pixels by two pixels on the display screen. This feature eliminates extra time required conventionally to write image data to an expanded display memory arrangement.

Where an image is superimposed on the PC display, the composite area is controlled by use of the control plane arrangement of the invention. This prevents the background image from becoming visible through the graphic image superimposed thereon. Where one graphic image is superimposed on another image, the chromakey-based control feature of the invention is utilized. This alleviates the burden on write control in writing a mouse cursor or the like to the control plane as needed.

In conjunction with a video conference system that furnishes a composite image made of individual images from a plurality of sources, the invention is capable of splitting the composite image back into the original images. These original images are displayed in a superimposed fashion in individual windows of a multi-window setup. This makes it possible to construct a video conference system that is appreciably easer to use than before.

What is claimed is:

1. A motion image display apparatus comprising:

a high speed bus which is capable of transferring motion image data at a required frame rate;

a video input device for digitizing an analog video signal by converting said analog video signal into a digital video data;

a memory device for storing data;

a scaling device for scaling said digital video data from said video input device in the horizontal or the vertical direction and forming scaled motion image data in real time;

a destination address table having a plurality of entries each of which specifies a start address at which a beginning of a scaled motion image data is to be stored or read from said memory device on a line by line basis;

a data transfer device which transfers on said high speed bus, said scaled motion image data or a portion of said scaled motion image data from said scaling device of a continuous address area to said memory device by using said destination address table and transfers, on said high speed bus, said scaled motion image data from said memory device to a display for displaying thereon using said destination address table; and a color space converter which converts color format of said scaled motion image data from said data transfer device to a format apparatus for said display.

2. A motion image display apparatus according to claim 1, wherein said destination address table contains one start address per each horizontal scan line of said scaled motion image data.

3. A motion image display apparatus according to claim 1, wherein said destination address table contains at least two start addresses per each horizontal scan line of said scaled motion image data.

4. A motion image display apparatus according to claim 2 or 3 comprising:

a function extending device which is connected to said high speed bus; and a second memory device which is connected to said high speed bus, and which is part of said function extending device.

5. A motion image display apparatus according to claim 4, wherein said function extending device is a video data compressing device for compressing said scaled motion image data from to compressed motion image data.

* * * * *